(12) United States Patent
Watanabe

(10) Patent No.: US 8,339,643 B2
(45) Date of Patent: Dec. 25, 2012

(54) IMAGE FORMING SYSTEM THAT CAN REDUCE PROCESSING TIME BY USING A DIFFERENCE INTEGRATION UNIT

(75) Inventor: Keisuke Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 981 days.

(21) Appl. No.: 12/379,322

(22) Filed: Feb. 19, 2009

(65) Prior Publication Data

US 2009/0213424 A1 Aug. 27, 2009

(30) Foreign Application Priority Data

Feb. 22, 2008 (JP) ................................ 2008-042026

(51) Int. Cl.
*G06F 3/12* (2006.01)
*G06K 15/00* (2006.01)
(52) U.S. Cl. ..................................... 358/1.15; 358/1.18

(58) Field of Classification Search .................... 358/1.1, 358/1.9, 1.12, 1.13, 1.14, 1.15, 1.16, 1.18, 358/440, 464, 474, 500
See application file for complete search history.

(56) References Cited

U.S. PATENT DOCUMENTS 6,549,301 B1 * 4/2003 Yasukawa ....................... 358/1.2
7,464,866 B2 * 12/2008 Mizoi ............................ 235/381

FOREIGN PATENT DOCUMENTS

JP A-2006-069093 3/2006

\* cited by examiner

*Primary Examiner* — Gabriel Garcia
(74) *Attorney, Agent, or Firm* — Posz Law Group, PLC

(57) ABSTRACT

An image forming system includes an image processing device and an image forming device. The image processing device includes a print job accepting unit, a job data creating unit, a differential job data creating unit, and a job data transmit unit. The image forming device includes a communication unit, and a print controller that forms images based on basic job data and diversion job data restored by the difference integration unit on a recording medium.

15 Claims, 22 Drawing Sheets

Fig.1
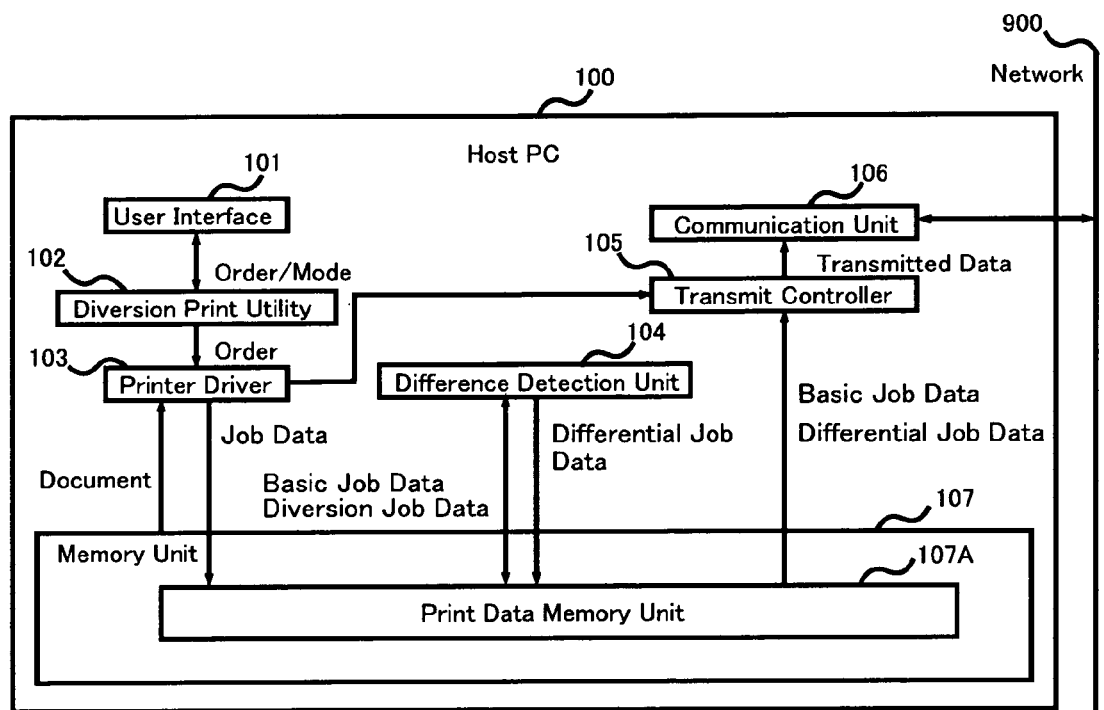
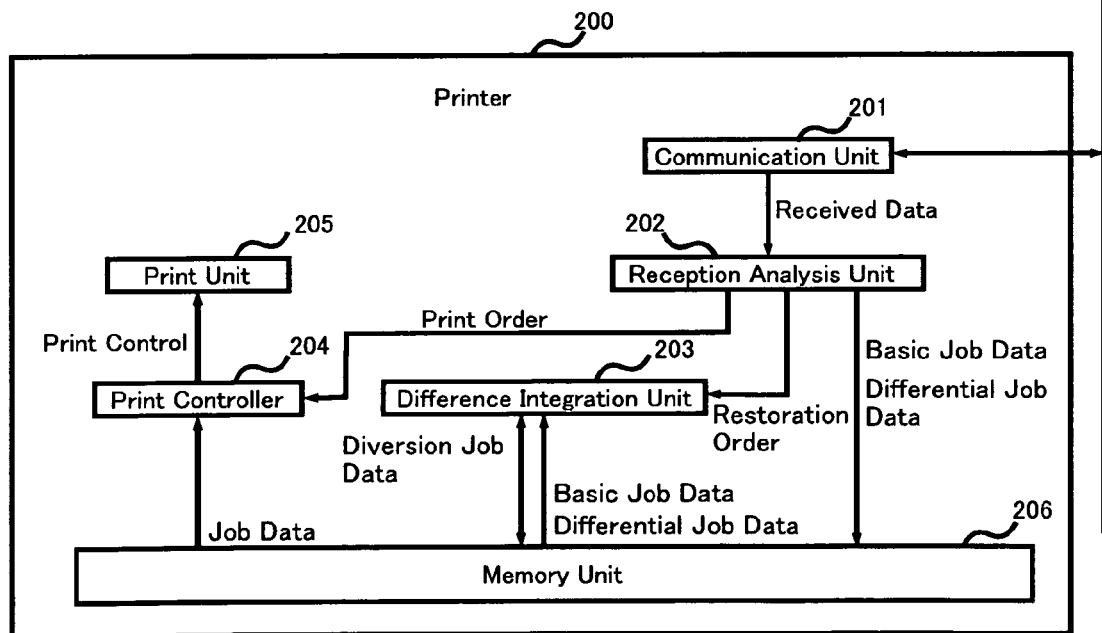

Fig.5

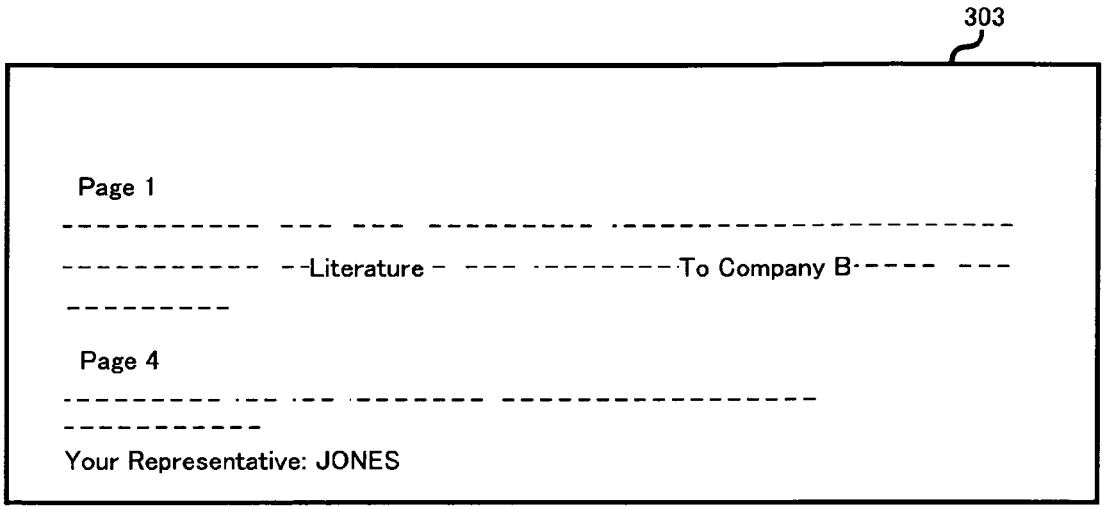

Fig.6

| ID | JOB Number | Data Type | Data |
|---|---|---|---|
| 0456 | 0000 | Basic Job Data | %PJL SIZE=5 ··· Page1· Literature···To Company A·· |
| 0456 | 0001 | Differential Job Data | Page1· ··· Literature ··· To Company B ··· |

Fig.7

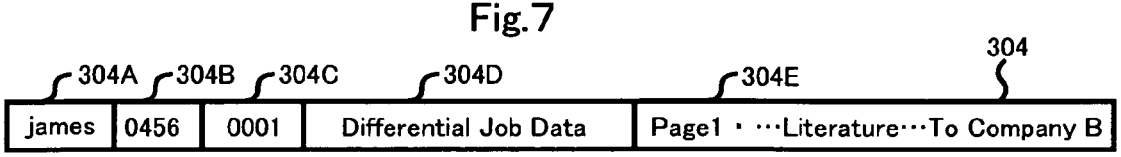

Fig.8

| User Name | ID | JOB Number | Data Type | Data |
|---|---|---|---|---|
| linda | 0127 | 0000 | Basic Job Data | %PJL SIZE=3 ··· Page1· ···· |
| james | 0456 | 0000 | Basic Job Data | %PJL SIZE=5· Page1· ··Literature···To Company A·· |
| james | 0456 | 0001 | Differential Job Data | Page1· ··· Literature ··· To Company B ··· |
| john | 0012 | 0000 | Basic Job Data | %PJL SIZE=10·· ·Page1·· ·· ···· ·· |

Fig.12

| ID | JOB Number | Data Type | Data |
|---|---|---|---|
| 0456 | 0000 | Basic Job Data | %PJL SIZE=5 ··· Page1· Literature···To Company A··· |

Fig.13

| james | 0456 | 0000 | Basic Job Data | %PJL SIZE=5 ··· Page1· Literature···To Company A··· |
|---|---|---|---|---|

Fig.14

| User Name | ID | JOB Number | Data Type | Data |
|---|---|---|---|---|
| james | 0456 | 0000 | Basic Job Data | %PJL SIZE=5 ··· Page1· Literature···To Company A·· |

Fig.15

| ID | JOB Number | Data Type | Data |
|---|---|---|---|
| 0456 | 0000 | Basic Job Data | %PJL SIZE=5 ··· Page1· Literature···To Company A··· |
| 0456 | 0001 | Diversion Job Data | %PJL SIZE=5 ··· Page1· Literature···To Company B··· |

Fig.16

| User Name | ID | JOB Number | Data Type | Data |
|---|---|---|---|---|
| james | 0456 | 0000 | Basic Job Data | %PJL SIZE=5· Page1· ··Literature···To Company A·· |
| james | 0456 | 0001 | Differential Job Data | Page1· ··Literature···To Company B·· |

Fig.17

| User Name | ID | JOB Number | Data Type | Data |
|---|---|---|---|---|
| james | 0456 | 0000 | Basic Job Data | %PJL SIZE=5· Page1· ··Literature···To Company A·· |
| james | 0456 | 0001 | Diversion Job Data | %PJL SIZE=5· Page1· ··Literature···To Company B·· |

Fig.18

| ID | JOB Number | Data Type | Data |
|---|---|---|---|
| 0456 | 0000 | Basic Job Data | %PJL SIZE=5· Page1· ··Literature···To Company A·· |
| 0456 | 9999 | Diversion Job Data | %PJL SIZE=5· Page1· ··Literature···To Company D·· |

Fig.19

| ID | JOB Number | Data Type | Data |
|---|---|---|---|
| 0456 | 0000 | Basic Job Data | %PJL SIZE=5· Page1· ··Literature···To Company A·· |
| 0456 | 9999 | Differential Job Data | Page1· ··Literature···To Company D·· |

Fig.20

| james | 0456 | 9999 | Differential Job Data | Page1· Literature···To Company D··· |
|---|---|---|---|---|

Fig.21

| User Name | ID | JOB Number | Data Type | Data |
|---|---|---|---|---|
| james | 0456 | 0000 | Basic Job Data | %PJL SIZE=5· Page1· ··Literature···To Company A·· |
| james | 0456 | 9999 | Differential Job Data | Page1· ··Literature···To Company D·· |

Fig.22

| User Name | ID | JOB Number | Data Type | Data |
|---|---|---|---|---|
| james | 0456 | 0000 | Basic Job Data | %PJL SIZE=5· Page1· ··Literature···To Company A·· |
| james | 0456 | 9999 | Diversion Job Data | %PJL SIZE=5· Page1· ··Literature···To Company D·· |

Fig.27
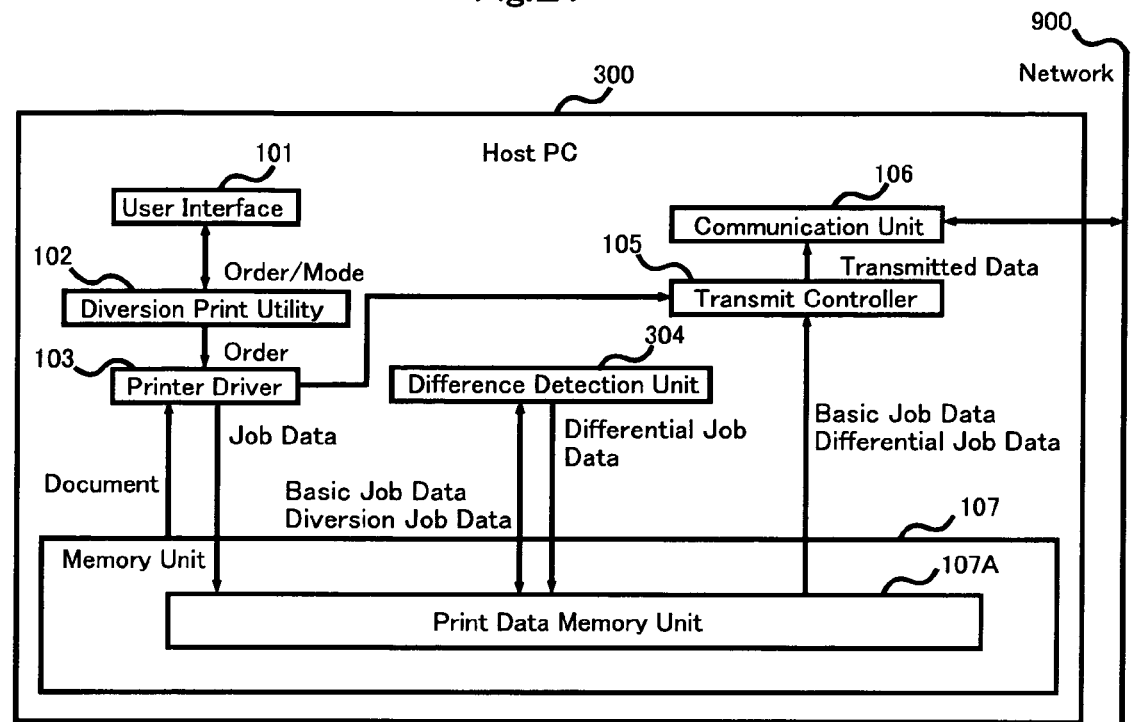
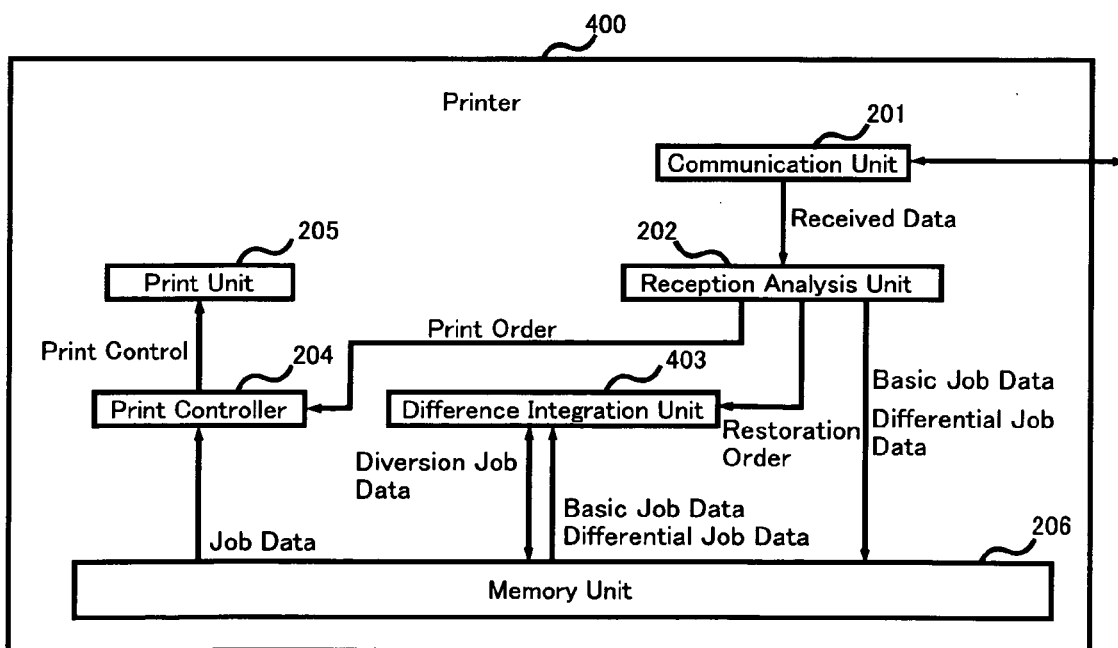

IMAGE FORMING SYSTEM THAT CAN REDUCE PROCESSING TIME BY USING A DIFFERENCE INTEGRATION UNIT

CROSS REFERENCE TO RELATED APPLICATION

The present application is related to, claims priority from and incorporates by reference Japanese Patent Application No. 2008-042026, filed on Feb. 22, 2008.

TECHNICAL FIELD

The present invention relates generally to image processing, and specifically to an image processing device that creates print jobs and to an image forming system including the image processing device and an image forming device that prints the print jobs.

BACKGROUND

A printing system that includes an image forming device that prints print jobs on a recording medium, and an image processing device that generates the print jobs based on a document created by a user, is well known. However, such a printing system has a number of processing steps to execute before the image forming device outputs actual printed matter in response to a user print command at the image processing device. These steps require a lot of time before the user obtains the printed matter.

SUMMARY

Therefore, in view of the above, it is an object of the present invention to provide an image forming system that can reduce the time that a user must wait to obtain until the user obtains the printed matter, and can keep the amount of print job data that is transmitted from the image processing device to the image forming device to a minimum.

In order to solve the problem mentioned above, the image forming system includes an image processing device configured to generate a print job based on a document created by a user. The image processing device includes: a print job accepting unit configured to accept a designation of a basic job from among a plurality of print jobs as well as to accept an input of a print execution order for the plurality of print jobs; a job data creating unit configured to create job data corresponding to the print jobs by accepting the input of print execution order via the print job accepting unit; a differential job data creating unit configured to create differential job data by comparing basic job data of the basic job and diversion job data of the other print job; and a job data transmit unit configured to transmit the basic job data and the differential job data created by the differential job data creating unit. An image forming device includes: a communication unit configured to receive the basic job data and the differential job data transmitted by the job data transmit unit; a difference integration unit configured to restore the diversion job data by use of the basic job data and the differential job data received via the communication unit; and a print controller configured to form images based on the basic job data and the diversion job data restored by the difference integration unit.

Also, an image processing device is for generating a print job based on documents created by a user and transmitting it to an image forming device. The image processing device includes: a print job accepting unit configured to accept a designation of a basic job from among a plurality of print jobs as well as to accept an input print execution order for the plurality of print jobs; a job data creating unit configured to create job data corresponding to the print job by accepting the input print execution order via the print job accepting unit; a differential job data creating unit configured to create differential job data by comparing basic job data of the basic job and diversion job data of the other print job; and a job data transmit unit configured to transmit the basic job data and the differential job data created by the differential job data creating unit to the image forming device.

Also, an imaging device includes: an image processor configured to accept a print execution order for a plurality of print jobs as well as a designation of a basic print job from among the plurality of print jobs, and to create differential print job data by comparing basic print job data of the basic print job with print job data of the plurality of print jobs other than the basic print job; and an image forming device configured to receive the basic print job data and the differential print job data and form images based on the received basic print job data and the differential print job data. Therefore, the time until the user obtains the printed matter can be reduced since the processing that the image forming device executes by the time it outputs the actual printed matter is simplified.

Also, the time until the user obtains the printed matter can be reduced, and the amount of data of the print jobs transmitted from the image processing device to the image forming device can be kept to a minimum.

BRIEF DESCRIPTION OF THE DRAWINGS

FIG. 1 is a block diagram illustrating a configuration of an image forming system.

FIG. 5 is a view illustrating the differential job data.

FIG. 6 is a view illustrating a memory format of the job data.

FIG. 7 is a view illustrating a memory format of the job data.

FIG. 8 is a view illustrating a memory format of the job data.

FIG. 12 is a view illustrating a memory format of the job data.

FIG. 13 is a view illustrating a memory format of the job data.

FIG. 14 is a view illustrating a memory format of the job data.

FIG. 15 is a view illustrating a memory format of the job data.

FIG. 16 is a view illustrating a memory format of the job data.

FIG. 17 is a view illustrating a memory format of the job data.

FIG. 18 is a view illustrating a memory format of the job data.

FIG. 19 is a view illustrating a memory format of the job data.

FIG. 20 is a view illustrating a memory format of the job data.

FIG. 21 is a view illustrating a memory format of the job data.

FIG. 22 is a view illustrating a memory format of the job data.

FIG. 27 is a block diagram illustrating a configuration of the image forming system.

DETAILED DESCRIPTION

Figure 2:
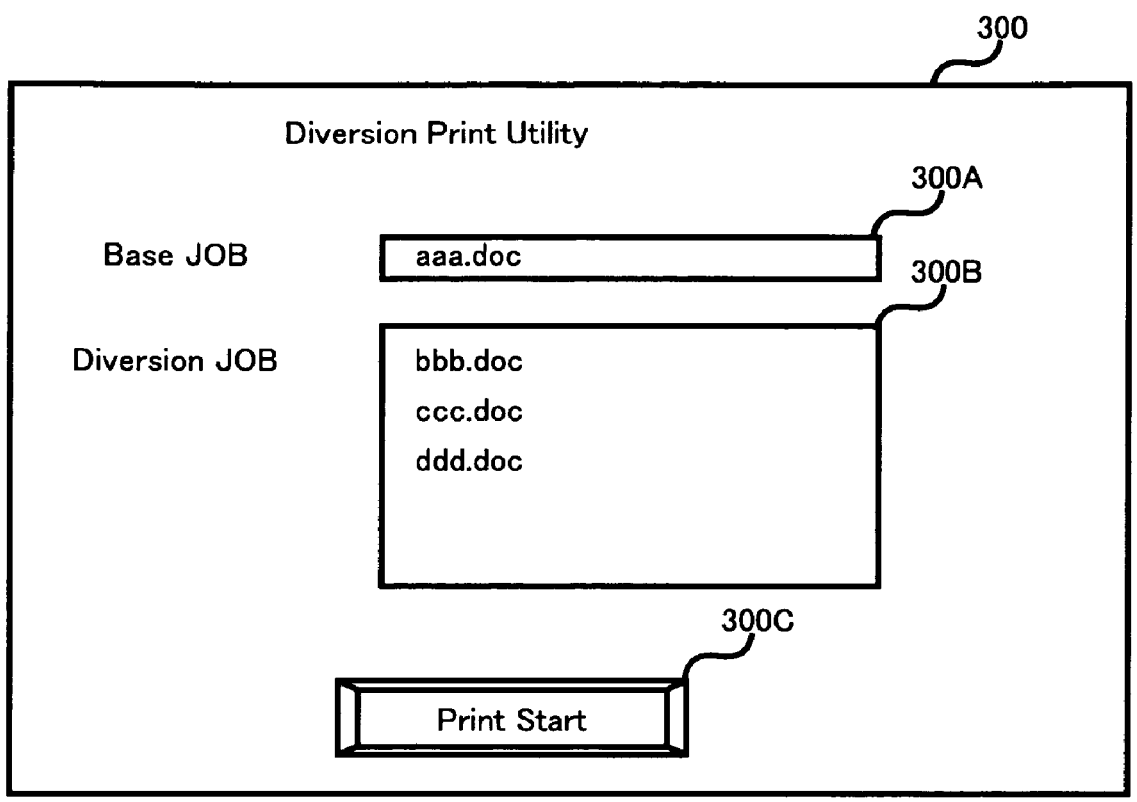
FIG. 2 is an example of user interface display.

Hereinafter, embodiments of the present invention are explained with reference to the drawings. In addition, the present invention is not limited to the description mentioned below, and may be suitably modified without departing from the scope of the invention.

First Embodiment

FIG. 1 is a block diagram illustrating the configuration of the image forming system, or imaging system, relating to a first embodiment of the present invention. The image forming system includes a host PC 100 as an image processing device that creates documents by the user's operation and generates a print job based on the documents, and a printer 200 as an image forming device that can form images, for example, by electrophotography. The host PC 100 and the printer 200 are connected via a network 900. The host PC 100 is explained first, and next, the printer 200 is explained.

First, the configuration of the host PC 100 is explained. The host PC 100 includes a user interface 101 for the user to control the host PC 100, a diversion print utility 102 as a print job accepting unit that controls a printer driver 103 by accepting the input to the user interface 101. The host PC 100 further includes: the printer driver 103 is a job data creating unit that converts the documents created by the user into job data. A difference detection unit 104 is a differential job data creating unit that creates differential job data; a transmit controller 105 is a job data transmit unit that controls transmission of the job data (basic job data and differential job data) to the printer 200; a communication unit 106 transmits the job data to the printer 200 via the network 900 based on the order of the transmit controller 105; a memory unit 107 that stores a control program etc. executed when the host PC 100 is controlled; and a print data memory unit 107A stores the job data (basic job data, diversion job data and differential job data).

The user interface 101 is an input-output device enabling the user to control the host PC 100 and includes, for example, a mouse, a keyboard, and a monitor that are not shown in the figure. The documents created by the user via the user interface 101 are stored in the memory unit 107.

The diversion print utility 102 displays a graphic user interface (GUI) 300 shown in FIG. 2 on the monitor of the user interface 101 (not shown) when it is activated by the user. The GUI 300 shown in FIG. 2 includes a base JOB text box 300A that accepts the input of a base JOB as a basis of the print job, a diversion JOB text box 300B that accepts the input of a diversion JOB as the other print job that is printed on the basis of the base JOB, and a print start button 300C that accepts an execution order of print execution. The GUI 300 in FIG. 2 shows an appearance that aaa.doc is input as the base JOB, and bbb.doc, ccc.doc, and ddd.doc are input as the diversion JOB. Although inputs of these print jobs are configured to be manually entered in the present embodiment, a document history that the user worked may be displayed in a popup menu, for example, and the print job may be selected from among the documents displayed in the popup menu. Also, the diversion print utility 102 provides an order for the printer driver 103 to convert the base JOB and the diversion JOB accepted via the GUI 300 to the job data.

Figure 3:
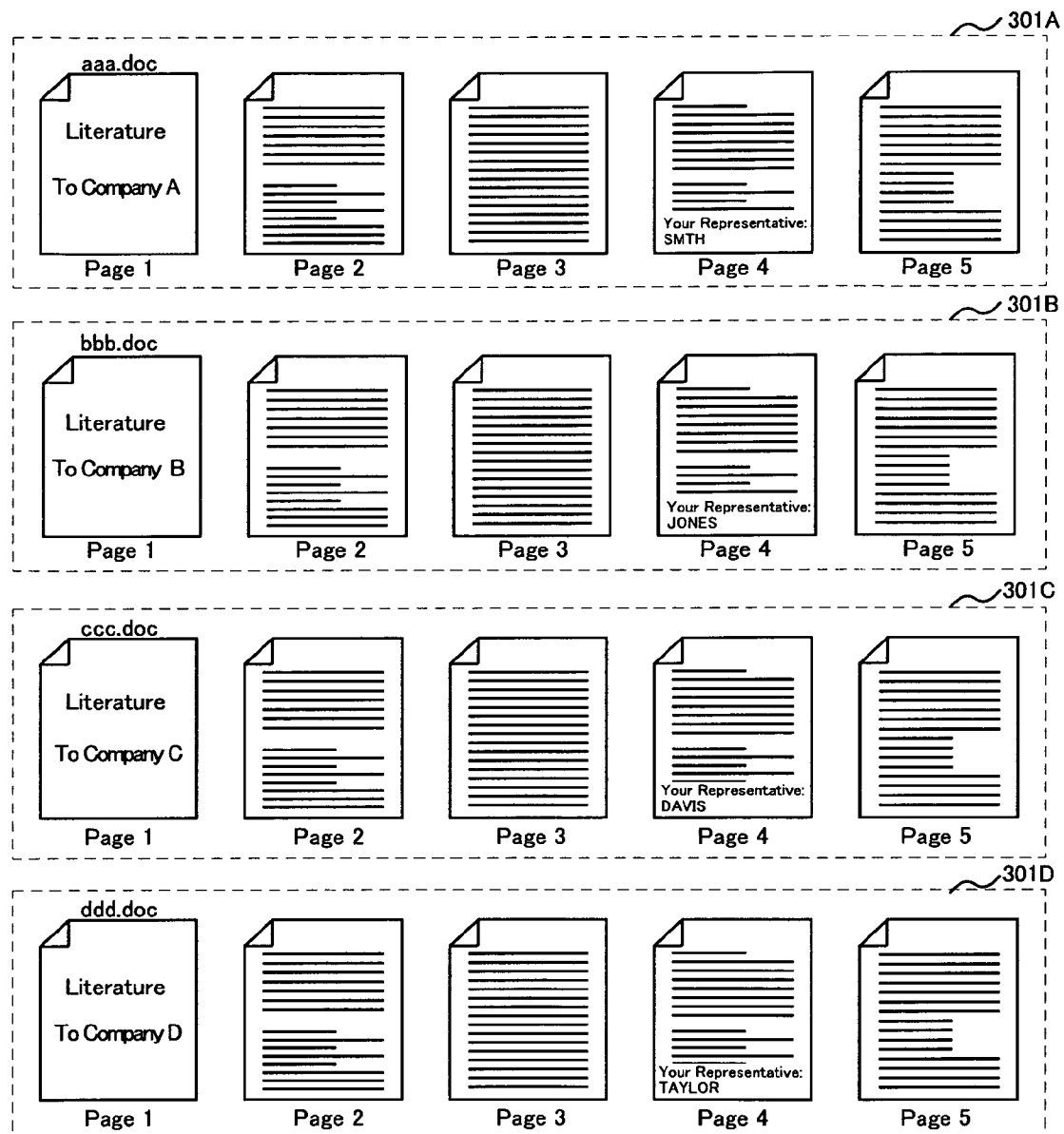
FIG. 3 is a view illustrating an example of documents.
Figure 4:
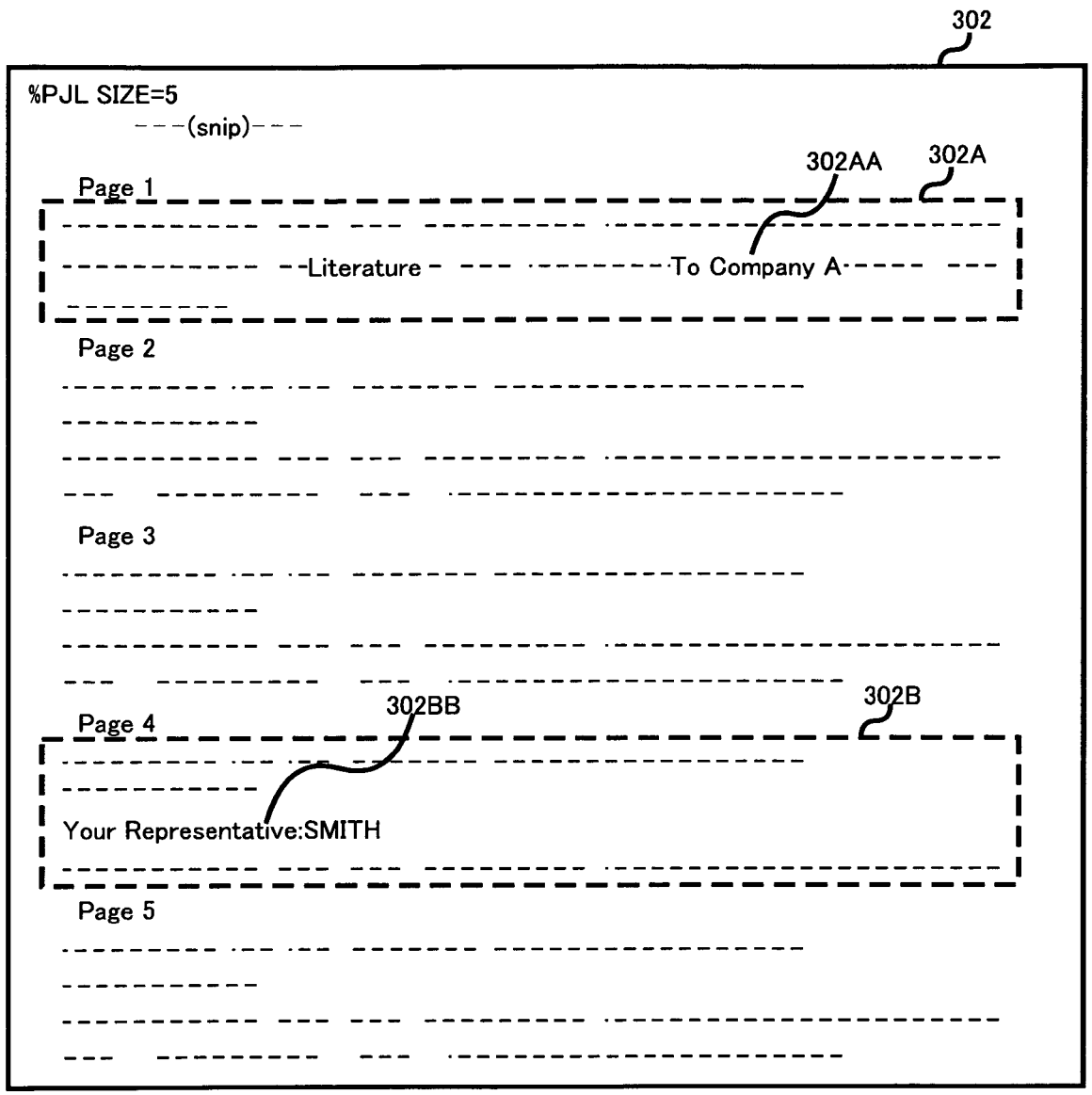
FIG. 4 is a conceptual diagram when the document is converted to the job data.

The printer driver 103 is provided with the order from the diversion print utility 102, and converts the documents, such as documents aaa.doc-301A, bbb.doc-301B, ccc.doc-301C, and ddd.doc-301D shown in FIG. 3 that have 5 pages respectively, for example, into the job data written in a description language that the printer 200 can interpret. In addition, in the documents shown in FIG. 3, there is no variation in page 2s, 3s, and 5s, and only company names in page 1s and representatives in page 4s differ. FIG. 4 is the conceptual diagram in which the printer driver 103 converts "aaa.doc" designated as the base JOB by the user into the job data that the printer 200 can interpret. The printer driver 103 stores the job data in the print data memory unit 107A after converting the documents into the job data. Also, when the target print job to be converted into the job data is the base JOB, the printer driver 103 instantly provides the order for the transmit controller 105 to transmit basic job data to the printer 200 after converting the document into the basic job data. On the other hand, when the target print job to be converted into the job data is the diversion JOB, the printer driver 103 provides the order for the difference detection unit 104 to detect the difference between the basic job data of the base JOB and diversion job data of the diversion JOB after converting the document into the diversion job data. Also, the printer driver 103 provides the order for the transmit controller 105 to transmit the differential job data to the printer 200 after generating the differential job data by the difference detection unit 104.

When the difference detection order between the basic job data of the base JOB and the diversion job data of the diversion JOB is provided by the printer driver 103, the difference detection unit 104 creates the differential job data shown in FIG. 5 by searching corresponding basic job data of the base JOB and diversion job data of the diversion JOB in the print data memory unit 107A and comparing the data of both jobs. The differential job data shown in FIG. 5 is the differential job data of the bbb.doc-301B diversion job data to the aaa.doc-301A basic job data when aaa.doc-301A is the base JOB and bbb.doc-301B is the diversion JOB. Also, the difference detection unit 104 stores the created differential job data into the print data memory unit 107A.

The transmit controller 105 assigns user names to the basic job data of the base JOB and the diversion job data of the diversion JOB designated by the printer driver 103 and provides the order for the communication unit 106 to transmit the job data to the printer 200 on the basis of a transmit command of the job data from the printer driver 103. In addition, the user name here is identifying information to identify a source of the job data such as the network ID of the host PC 100.

The communication unit 106 transmits the job data to the printer 200 via the network 900 on the basis of the transmit command of the job data by the transmit controller 105.

The diversion print utility 102, the printer driver 103, the difference detection unit 104, the transmit controller 105, and the communication unit 106 including the functions mentioned above are application programs that operate on an operating system of the host PC 100 that is not shown in the figure. The application programs are stored in a nonvolatile memory such as an ultra-violet erasable programmable read only memory (UV-EPROM), or an electronically erasable and programmable read only memory (EEPROM), and perform a function when a central processing unit (CPU) that is not shown in the figure reads the programs out from the memory unit 107 and executes processing on the basis of an execution command.

The memory unit 107 is a memory region including a hard disk drive (HDD), flash memory, or a random access memory (RAM), for example. The memory unit 107 furthermore includes the print data memory unit 107A storing the basic job data of the base JOB and the diversion job data of the diversion JOB. The job data stored in the print data memory unit 107A are stored relating to ID, JOB number, and data type as shown in FIG. 6. The ID is an arbitrary unique value obtained when the execution order of print execution is input by the user via the diversion print utility 102. The ID is common among a plurality of jobs (one base JOB and a plurality of diversion JOBs) that are provided for printing at an operation of the diversion print utility 102. The JOB number is a unique value in the identical ID. The job of the diversion JOB processed at last is definitely set as the number 9999, and the other jobs are set at incremented values from 0000 in an order of processing. The data type is set as "Basic Job Data" when the job data is that of the base JOB. Also, it is set as "Diversion Job Data" when the job data is that of the diversion JOB, and it is set as "Differential Job Data" when the job data is that of the differential job data.

Hereinafter, the job data that includes added user name in the header is merely called data.

Next, the configuration of the printer 200 is explained. The printer 200, as shown in FIG. 1, includes a communication unit 201 that receives data transmitted from the host PC 100, a reception analysis unit 202 that provides the order of print execution to a print controller 204 as well as stores data provided from the communication unit 201 into a memory unit 206, a difference integration unit 203 that restores the diversion job data of the diversion JOB from the received differential job data, a print controller 204 that rasterizes (i.e. converts data into raster data) the basic job data of the base JOB and the diversion job data of the diversion JOB and provides the execution order of a print execution to a print unit 205 on the basis of the order from the reception analysis unit 202. The print unit 205 forms the image on the recording media on the basis of the order from the print controller. Also, the memory unit 206 stores the basic job data or the differential job data.

The communication unit 201 receives the data transmitted by the host PC 100 via the network 900, and provides the received data to the reception analysis unit 202. As mentioned above, the received data of the communication unit 201 is the basic job data or the differential job data that is added the user name at the header by the transmit controller 105 in the host PC 100. As shown in FIG. 7, the data is configured with user name 304A, ID 304B, JOB number 304C, data type 304D, and print job data 304E. The user name here is, for example, "james" (FIG. 7).

When the reception analysis unit 202 is provided the data from the communication unit 201, it provides the order of the print execution to the print controller 204 as well as stores the data in the memory unit 206. Here, when the data type provided by the communication unit 201 is the basic job data, the reception analysis unit 202 provides the order of the print execution to the print controller 204. On the other hand, when the data type provided by the communication unit 201 is the differential job data, the reception analysis unit 202 provides the order for the difference integration unit 203 to restore the diversion job data of the diversion JOB. Also, the reception analysis unit 202 provides the order of print execution to the print controller 204 after restoring the diversion job data of the diversion JOB by the difference integration unit 203.

When the difference integration unit 203 is provided with a restoration order of the diversion job data of the diversion JOB by the reception analysis unit 202, it restores the diversion job data of the diversion JOB by searching corresponding basic job data and differential job data in the memory unit 206 and integrating them, and stores the diversion job data in the memory unit 206.

The print controller 204 reads out the basic job data of the base JOB designated by the reception analysis unit 202 or the diversion job data of the diversion JOB restored by the difference integration unit 203 from the memory unit 206, and rasterizes them on the basis of the print order from the reception analysis unit 202. Furthermore, the print controller 204 provides the order for the print unit 205 to print the raster data corresponding to the basic job data of the base JOB or the diversion job data of the diversion JOB.

The communication unit 201, the reception analysis unit 202, the difference integration unit 203, and the print controller 204 including the functions mentioned above are the application programs that the printer 200 includes. The application programs are stored in a nonvolatile memory such as a UV-EPROM, or an EEPROM, and perform a function when a CPU that is not shown in the figure reads them out from the memory unit 206 and executes processing on the basis of an execution command.

The print unit 205 is a print engine that can form images by electrophotography, for example, and forms the images on the recording medium on the basis of the order from the print controller 204.

The memory unit 206 is a memory region including an HDD, a flash memory, or a RAM, for example. The memory unit 206 stores the basic job data or the differential job data for each user name shown in the FIG. 8.

Figure 9:
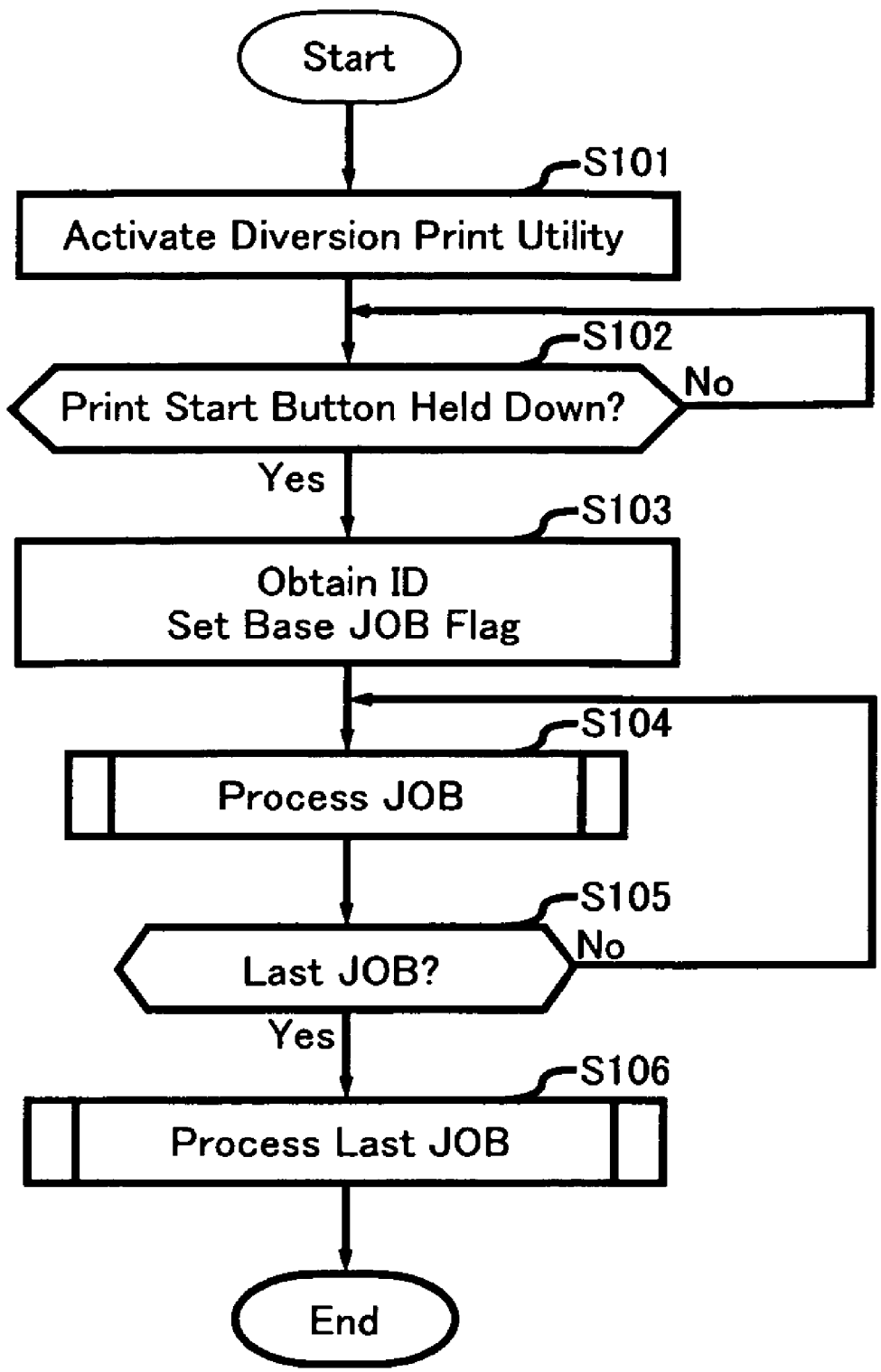
FIG. 9 is a flow diagram illustrating a processing operation of a diversion print utility.

Hereinafter, the operation of the image forming system including the configurations above is explained. To begin with, it is explained the processing executed by the diversion print utility 102 by use of FIG. 9 which is a flow diagram illustrating the processing operation of the diversion print utility 102.

To begin with, the diversion print utility 102 is activated on the basis of an activation order by the user via the user interface 101 such as a mouse that is not shown in the figure (S101). The activated diversion print utility 102 displays the GUI 300 shown in FIG. 2 on a monitor that is not shown in the figure. The diversion print utility 102 stands by until the input to the base JOB text box 300A and the diversion JOB text box 300B is completed and the print start button 300C is held down by the user (S102). In addition, as shown in FIG. 2, aaa.doc-301A is input in the base JOB text box 300A as the base JOB by the user, and bbb.doc-301B, ccc.doc-301C, and ddd.doc-301D are input in the diversion JOB text box 300B as the diversion JOB by the user.

When the input by the user is completed and the print start button is held down (S102, Yes), the diversion print utility 102 obtains unique IDs to the base JOB and the diversion JOB. In addition, the ID numbers 0000-0455 are used before, and the diversion print utility 102 obtains 0456 as the ID. Also, the diversion print utility 102 sets a base JOB flag showing that aaa.doc-301A is the base JOB (S103).

Next, the diversion print utility 102 provides the order to process aaa.doc-301A, as well as to inform ID=0456, to the printer driver 103 (S104). The processing of the printer driver 103 is explained later.

Next, the diversion print utility 102 calculates the number of unfinished diversion JOBs that are input in the diversion JOB text box 300B. Since the umber of unfinished diversion JOBs at this point are three of bbb.doc-301B, ccc.doc-301C, and ddd.doc-301D, the diversion print utility 102 provides the order to process bbb.doc-301B, as well as informing ID=0456 to the printer driver 103 (S104). The processing of the printer driver 103 is explained later. Also, the diversion print utility 102 processes ccc.doc-301C in the same way.

When the diversion print utility 102 judges that the remaining unfinished diversion JOB is only ddd.doc-301D at S105 after completing the processing of ccc.doc-301C (S105, Yes), it sets the last flag showing that it is the last unfinished diversion JOB. The diversion print utility 102 provides the order to process ddd.doc-301D, as well as informing ID=0456, to the printer driver 103 (S106), and ends the processing.

Figure 10:
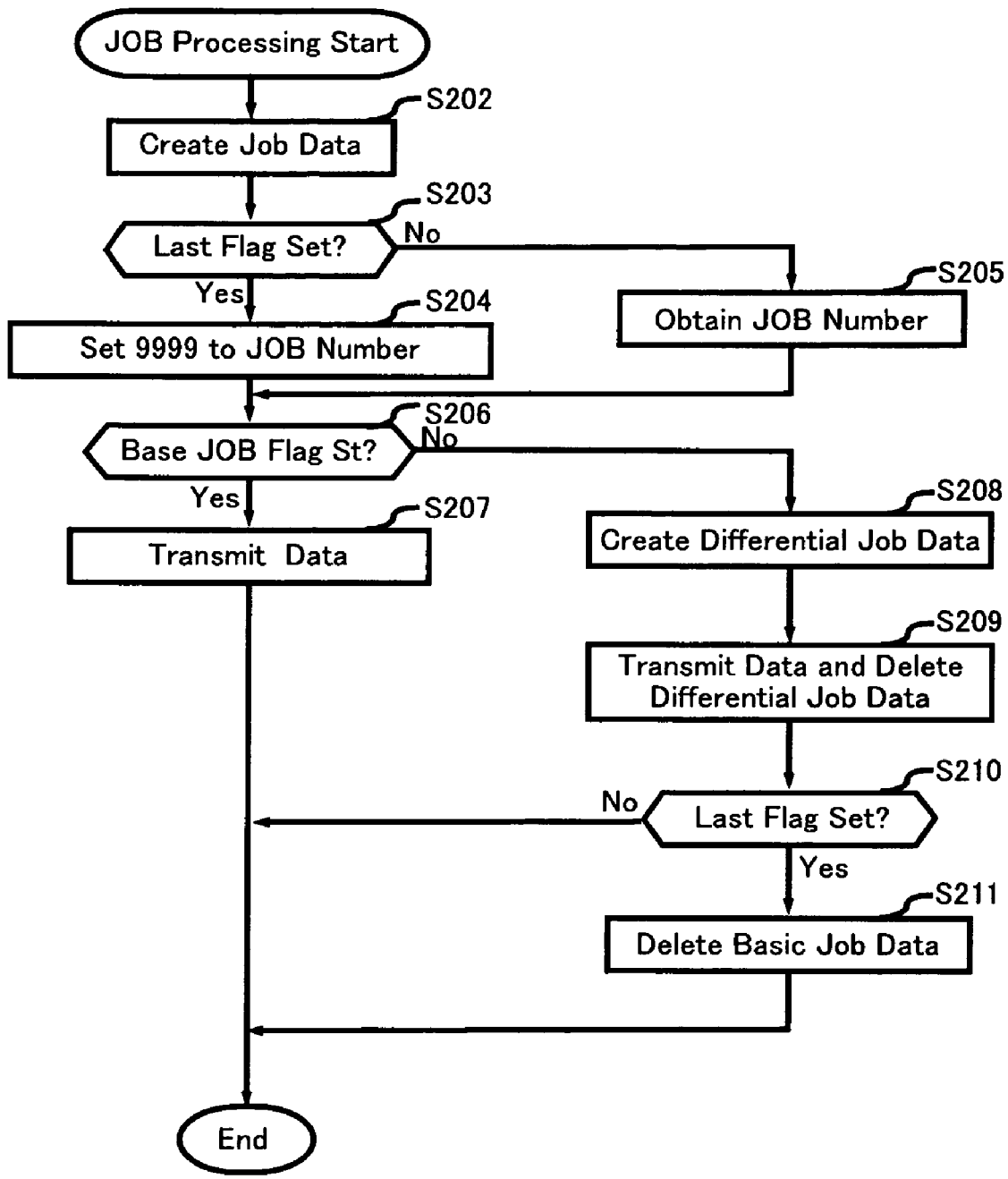
FIG. 10 is a view illustrating a processing operation executed by a printer driver.
Figure 11:
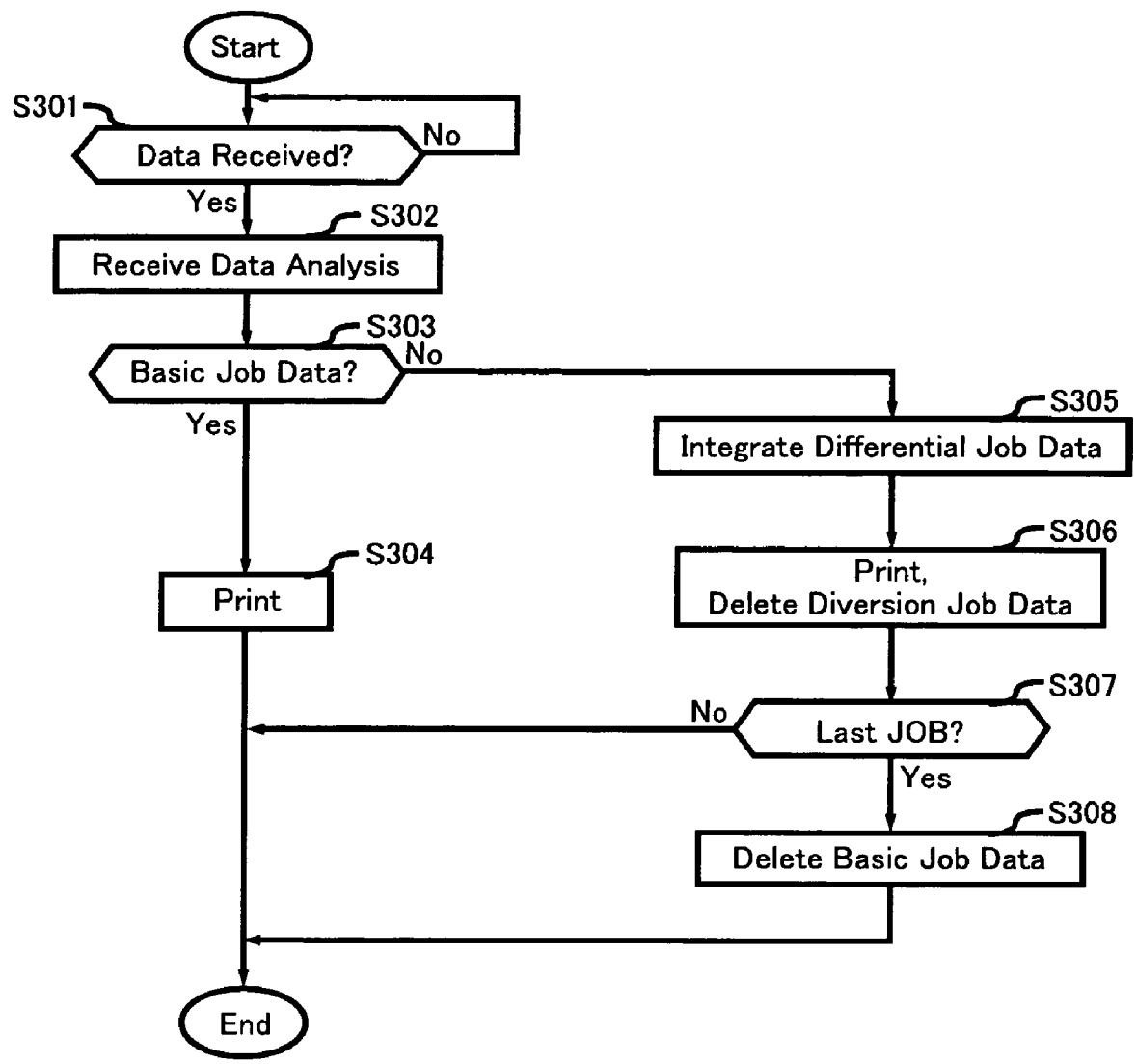
FIG. 11 is a view illustrating a processing operation executed by a printer.

Next, the processing operation of the printer driver 103 that executes the processing on the basis of the order from the diversion print utility 102 and the processing operation of the printer 200 receiving the transmitted data are explained by use of FIGS. 10 and 11. FIG. 10 is a flow diagram illustrating the processing executed by the printer driver 103 mainly with receiving the provision of the order from the diversion print utility 102, and FIG. 11 is the flow diagram illustrating the processing executed by the printer 200 that received the transmitted data.

Receiving the provision of the order from the diversion print utility 102, the printer driver 103 executes sequentially 1) the processing relating to aaa.doc-301A (the base JOB), 2) the processing relating to bbb.doc-301B and ccc.doc-301C (the diversion JOB), and 3) the processing relating to ddd.doc-301D (the last diversion JOB). To begin with, 1) the processing relating to aaa.doc-301A (the base JOB) is explained.

The printer driver 103 after receiving the execution order of the processing of aaa.doc-301A as the base JOB reads out aaa.doc-301A stored in the memory unit 107 and creates the basic job data shown in FIG. 4 (S202).

Next, the printer driver 103 checks whether the last flag indicative of the last unfinished diversion JOB is set or not (S203). If the last flag has not been set to aaa.doc-301A (S203, No), the printer driver obtains a unique JOB number. The number 0000 is set as the JOB number here (S205).

Next, the printer driver 103 checks whether the base JOB flag indicating that the base JOB is set or not (S206). Since the base JOB flag has been set to aaa.doc-301A (S206, Yes), the printer driver 103 relates ID, JOB number, and data type to the basic job data, and stores the basic job data in the print data memory unit 107A within the memory unit 107 (FIG. 12).

Next, the printer driver 103 provides the order for the transmit controller 105 to transmit the basic job data. The transmit controller 105 receiving the transmit order of the basic job data reads out the basic job data from the print data memory unit 107A to transmit to the printer 200, and adds "james" to the header as the user name (FIG. 13). And, the transmit controller 105 provides the data to the communication unit 106. The communication unit 106 receiving the data transmits the data to the printer 200 via the network 900 (S207), and ends the processing.

The reception analysis unit 202 receiving the transmitted data from the host PC 100 via the communication unit 201 (S301, Yes) stores the received data in the memory unit 206 as shown in FIG. 14. Furthermore, the reception analysis unit 202 analyzes the data type of the received data (S302). Since the received data is the basic job data (S303, Yes), the reception analysis unit 202 provides the order for the print controller 204 to execute the printing.

The print controller 204 receiving the order of the print execution reads out the basic job data stored in the memory unit 206, rasterizes the basic job data, and provides the data to the print unit 206. The print unit 206 receiving the raster data forms the image on the recording medium.

Following this, 2) the processing relating to bbb.doc-301B and ccc.doc-301C (the diversion JOB) is explained. Since 2) the processing of bbb.doc-301B and ccc.doc-301C is identical, the processing relating to bbb.doc-301B is explained here. In addition, since the processing at S202, S203, and S205 is identical to 1) aaa.doc-301A, the explanation is omitted here.

The printer driver 103 checks whether the base JOB flag indicating the base JOB is set or not at S206. Since the base JOB flag is not set here (S206, No), the printer driver 103 stores the diversion job data in the print data memory unit 107A as shown in FIG. 15, as well as providing the order for the difference detection unit 104 to create the differential job data.

The difference detection unit 104 after receiving the creation order of the differential job data reads out the basic job data and the diversion job data stored in the print data memory unit 107A, and creates the differential job data by comparing both sets of data (S208). The created differential job data is related to ID, JOB number, and data type, and stored in the print data memory unit 107A as the differential job data. Creation of the differential job data by the difference detection unit 104 is described later.

Next, the printer driver 103 provides the order for the transmit controller 105 to transmit the differential job data. The transmit controller 105 after receiving the transmission order of the differential job data reads out the differential job data to transmit to the printer 200 from the print data memory unit 107A, and adds "james" to the header as the user name (FIG. 7). And, the transmit controller 105 provides the data to the communication unit 106. The communication unit 106 provided the data transmits the data to the printer 200 via the network 900. Also, the printer driver 103 deletes the differential job data stored in the print data memory unit 107A, and the print data memory unit 107A returns to the mode shown in FIG. 12 (S209).

Next, the printer driver 103 checks whether the last flag indicative of the last unfinished diversion JOB is set or not (S210). Since the last flag is not set here (S210, No), the printer driver 103 ends the processing.

The reception analysis unit 202 after receiving the data transmitted by the host PC 100 via the communication unit 201 (S301, Yes) stores the received data in the memory unit 206 as shown in FIG. 16. Furthermore, the reception analysis unit 202 analyzes the data type of the received data (S302). Since the received data is the differential job data here (S303, No), the reception analysis unit 202 provides the order for the difference integration unit 203 to restore the diversion job data of the diversion JOB. The difference integration unit 203 after receiving the restoration order of the diversion JOB restores the diversion job data of the diversion JOB by searching corresponding basic job data and differential job e data in the memory unit 206 and integrating them, and stores them in the memory unit 206 as the diversion job data shown in FIG. 17 (S305). The restoration of the diversion job data of the diversion JOB by the difference integration unit 203 is described later.

Next, the reception analysis unit 202 provides the order for the print controller 204 to execute printing. The print controller 204 after receiving the order of the print execution reads out the diversion job data stored in the memory unit 206 and provides the diversion job data to the print unit 206 after rasterizing it. The print unit 205 after receiving the raster data forms the image on the recording medium. Furthermore, the reception analysis unit 202 deletes the diversion job data of the diversion JOB stored in the memory unit 206 (S306), and the memory unit 206 enters the mode shown in FIG. 14.

Furthermore, the reception analysis unit 202 checks whether the JOB number related to the diversion JOB is 9999 or not (S307). Since the JOB number is not 9999 here (S307, No), the reception analysis unit 202 ends the processing.

Following this, an explanation of 3) the processing relating to ddd.doc-301D (the last diversion JOB) is provided. To begin with, the printer driver 103 after receiving the execution order of the processing of ddd.doc-301D as the last diversion JOB reads out ddd.doc-301D stored in the memory unit 107 and creates the diversion job data (S202).

Next, the printer driver 103 checks whether the last flag showing that it is the last unfinished diversion JOB is set or not (S203). Since the last flag has been set to ddd.doc-301D (S203, Yes), the printer driver 103 sets 9999 as the JOB number (S204).

Next, the printer driver 103 checks whether the base JOB flag showing that it is the base JOB is set or not (S206). Since the base JOB flag is not set here (S206, No), the printer driver 103 stores the diversion job data in the print data memory unit 107A as shown in FIG. 18, as well as provides the order for the difference detection unit 104 to create the differential job data.

The difference detection unit 104 after receiving the creation order of the differential job data reads out the basic job data and the diversion job data stored in the print data memory unit 107A and creates the differential job data by comparing them (S208). The created differential job data is related to ID, JOB number, and data type as shown in FIG. 19, and is stored in the print data memory unit 107A. The creation of the differential job data by the difference detection unit 104 is described later.

Next, the printer driver 103 provides the order for the transmit controller 105 to transmit the differential job data. The transmit controller 105 provided the transmission order of the differential job data reads out the differential job data from the print data memory unit 107A to transmit it to the printer 200, and adds "james" at the header as the user name (FIG. 20). And, the transmit controller 105 provides the data to the communication unit 106. The communication unit 106 provided the data transmits the data to the printer 200 via the network 900. Also, the printer driver 103 deletes the differential job data stored in the print data memory unit 107A, and the print data memory unit 107A returns to the mode shown in FIG. 12 (S209).

Next, the printer driver 103 checks whether the last flag showing that it is the last unfinished diversion JOB is set or not (S210). Since the last flag is set here (S210, Yes), the printer driver 103 deletes the basic job data of the base JOB stored in the print data memory unit 107A (S211), and ends the processing.

The reception analysis unit 202 after receiving the transmitted data by the host PC 100 via the communication unit 201 (S301, Yes) stores the received data in the memory unit 206 as shown in FIG. 21. Furthermore, the reception analysis unit 202 analyzes the data type of the received data (S302). Since the received data is the differential job data here (S303, No), the reception analysis unit 202 provides the order for the difference integration unit 203 to restore the diversion job data of the diversion JOB. The difference integration unit 203 provided the restoration order of the diversion JOB restores the diversion job data of the diversion JOB by searching corresponding basic job data and differential job data in the memory unit 206 and integrating them, and stores the diversion job data in the memory unit 206 as shown in FIG. 22 (S305). The restoration of the diversion job data of the diversion JOB by the difference integration unit 203 is described later.

Next, the reception analysis unit 202 provides the order for the print controller 204 to execute the print. The print controller 204 after receiving the print execution order reads out the diversion job data stored in the memory unit 206 and provides the diversion job data to the print unit 205 after rasterizing it. The print unit 205 provided the raster data forms the image on the recording medium. Furthermore, the reception analysis unit 202 deletes the diversion job data of the diversion JOB stored in the memory unit 206 (S306), and the memory unit 206 enters the mode shown in FIG. 14.

Furthermore, the reception analysis unit 202 checks whether the JOB number related to the diversion JOB is 9999 or not (S307). Since the JOB number is 9999 here (S307, Yes), the reception analysis unit 202 deletes the basic job data of the base JOB, and ends the processing.

Figure 23:
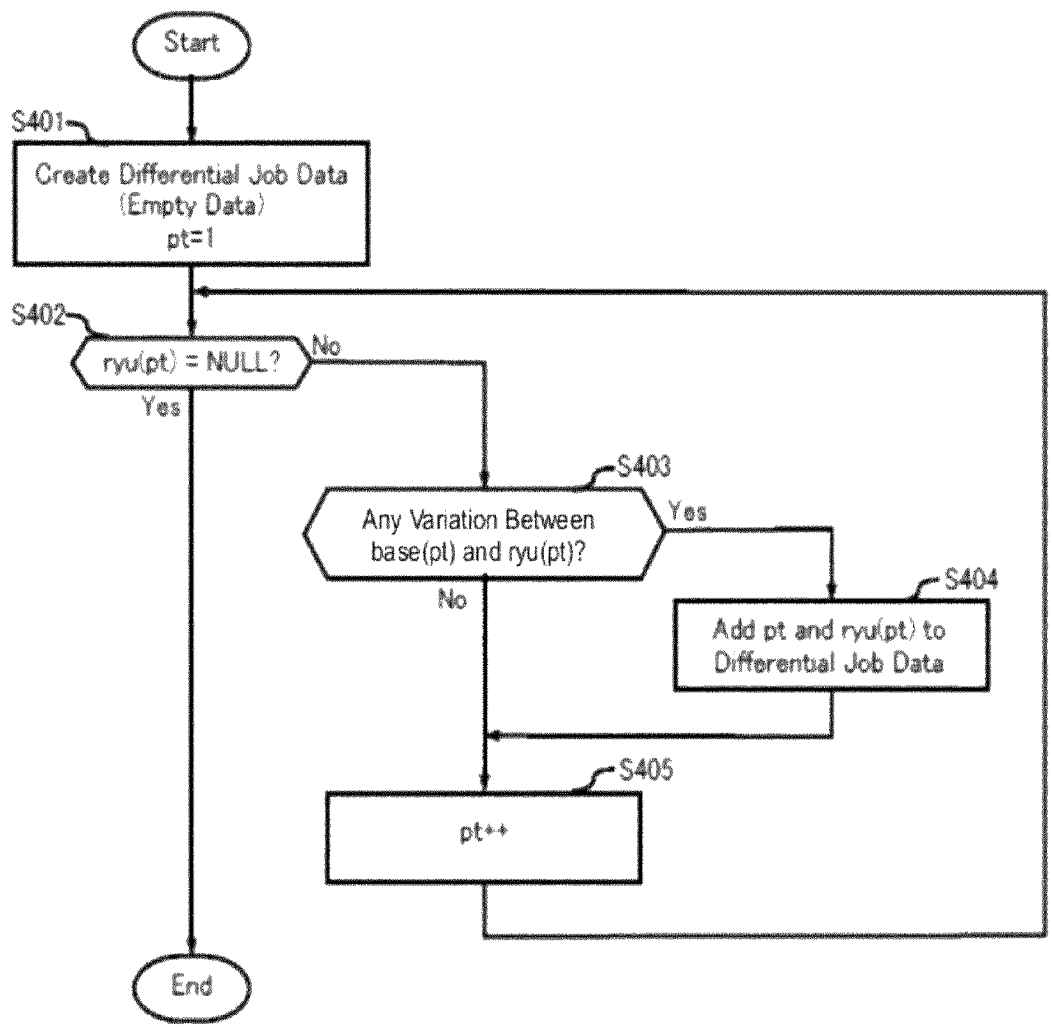
FIG. 23 is a flow diagram illustrating the processing that a difference detection unit creates a differential job data.
Figure 24:
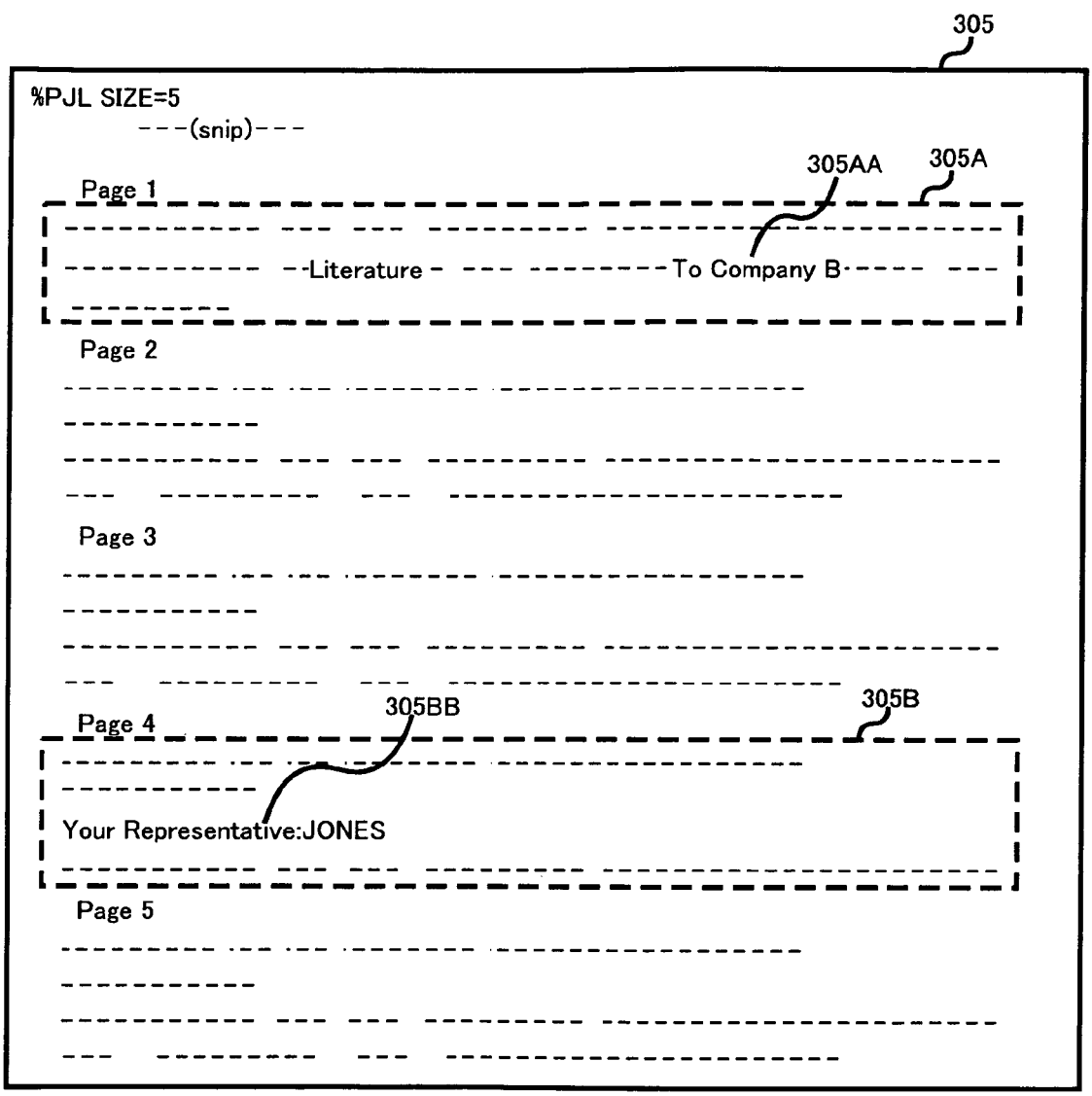
FIG. 24 is a conceptual diagram when the document is converted to the job data.

Next, the processing of creating the differential job data for the difference detection unit 104 is explained by use of FIG. 23. Here, it is explained the processing of creating the differential job data considering that aaa.doc-301A is the base JOB and bbb.doc-301B is the diversion JOB. Also, the basic job data 302 of aaa.doc-301A shown in FIG. 4 and the diversion job data 305 of bbb.doc-301B shown in FIG. 24 are created by the printer driver 103, and each of them is stored in the memory unit 107.

At S208 in FIG. 10, when the difference detection unit 104 is provided with the activation order by the printer driver 103, it reads out the basic job data of the base JOB and the diversion job data of the diversion JOB stored in the memory unit 107, and develops them in the working memory. In addition, the page data of the basic job data developed in the working memory is referred to as base(n), and the page data of the diversion job data is referred to as ryu(n). Page 1 data of the basic job data is referred to as base(1), for example. That is to say, base(1)-base(5) correspond to each page of the basic job data to aaa.doc-301A, and ryu(1)-ryu(5) correspond to each page of the diversion job data to bbb.doc-301B. Also, the difference detection unit 104 initializes pt to 1, pt being a page number variable in the page comparison processing. Furthermore, the difference detection unit 104 creates empty differential job data in the memory (S401).

At S402, the difference detection unit 104 checks whether ryu(1) is NULL data or not. Since ryu(1) is not NULL data here (S402, No), the difference detection unit 104 checks whether there is any variation or not between base(1) and ryu(1) by comparison (S403). In particular, the difference detection unit 104 compares the page 1 data 302A in the basic job data 302 shown in FIG. 4 and the page 1 data 305A in the diversion job data 305 shown in FIG. 24. Here, "A" of point 302AA in the page 1 data 302A and "B" of point 305AA in the page 1 data 305A are different. Therefore, since there is a variation between base(1) and ryu(1) (S403, Yes), pt=1 and ryu(1) is added to the differential job data (S404).

Next, the difference detection unit 104 again executes the processing from S402 with pt=2 (S405).

Similarly, the difference detection unit 104 checks whether ryu(2) is NULL data or not. Since ryu(2) is not NULL data here(S402, No), the difference detection unit 104 checks whether there is any variation or not between base(2) and ryu(2) by comparison (S403). Since there is no variation here (S403, No), the difference detection unit 104 executes the processing from the S402 again with pt=3 (S405). In the present embodiment, since there is no variation between base(n) and ryu(n) for pt=3 and 5, the difference detection unit 104 executes the processing in the same way in pt=2. Therefore, the explanation of the processing for pt=3 and 5 is omitted.

In pt=4, the difference detection unit 104 checks whether ryu(4) is NULL data or not. Since ryu(4) is not NULL data here (S402, No), the difference detection unit 104 checks whether there is any variation or not between base(4) and ryu(4) by comparison (S403). The difference detection unit 104 compares, in the same way in page 1 data, page 4 data 302B in the basic job data 302 shown in FIG. 4 and page 4 data 305B in the diversion job data 305 shown in FIG. 24. Here, "SMITH" of the point 302BB in page 4 data 302B and "JONES" of the point 305BB in page 4 data 305B are different. Therefore, since there is a variation between base(4) and ryu(4) (S403, Yes), pt=4 and ryu(4) are added to the differential job data (S404).

At last, in pt=6, the difference detection unit 104 checks whether ryu(6) is NULL data or not. Since ryu(6) is NULL data (S402, Yes), the difference detection unit 104 stores the differential job data shown in FIG. 5 in the print data memory unit 107A, and ends the processing.

Figure 25:
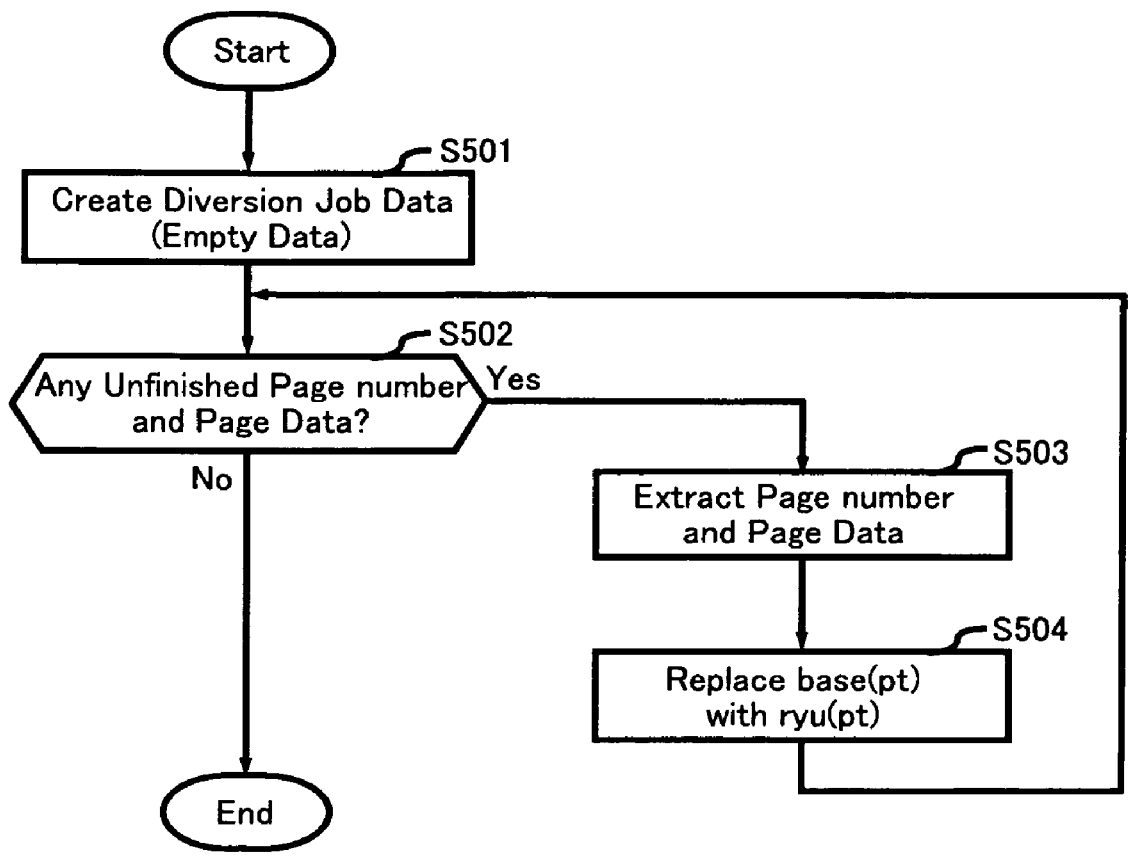
FIG. 25 is a flow diagram illustrating the processing that a difference integration unit restores a diversion job data.
Figure 26:
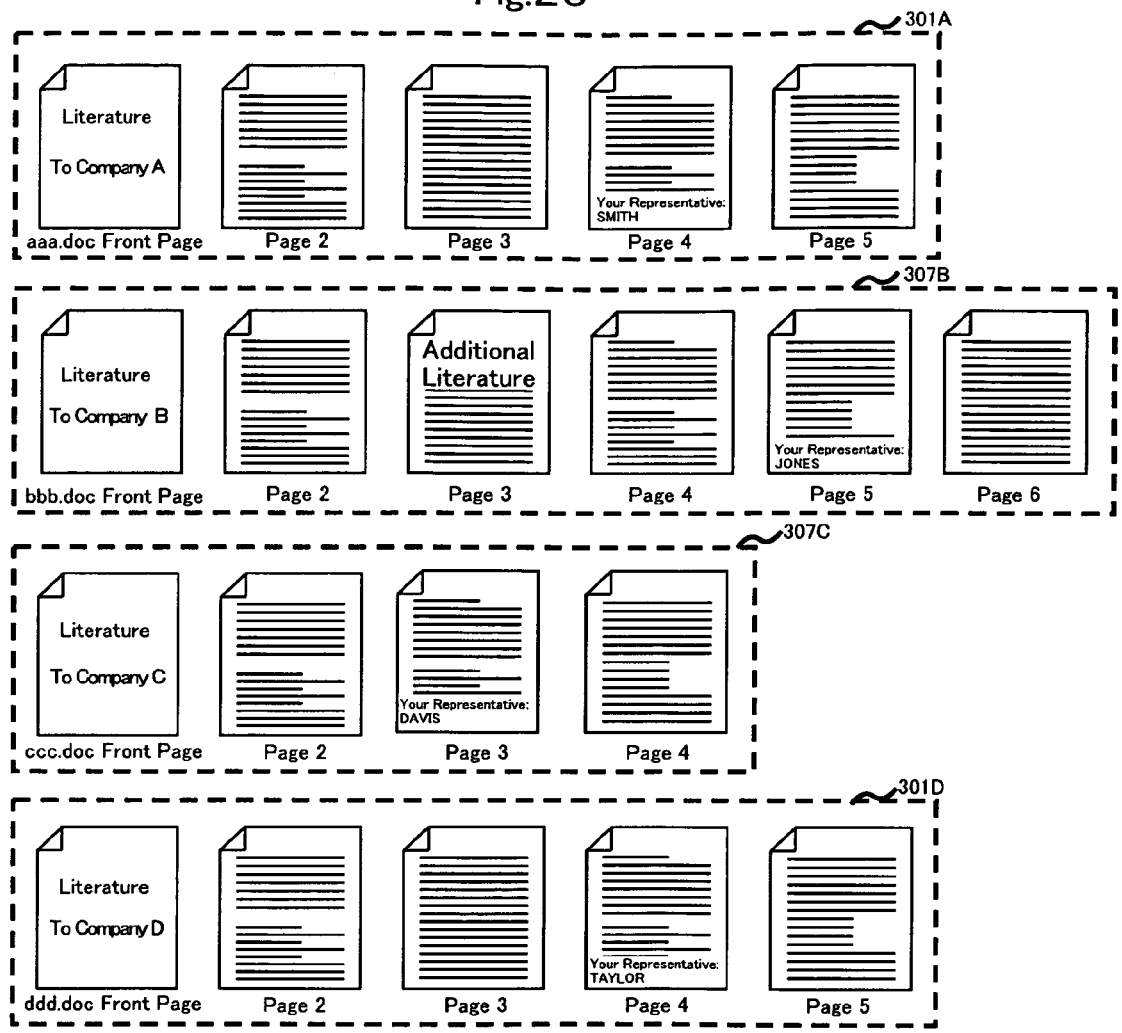
FIG. 26 is a view illustrating an example of documents.

Next, processing for restoring the diversion job data for the difference integration unit 203 is explained by use of FIG. 25. Here, the processing of restoring the diversion job data considering that aaa.doc-301A is the base JOB and bbb.doc-301B is the diversion JOB is explained. Also, the printer 200 receives the basic job data and the differential job data as the data from the host PC 100, and the data are stored in the memory unit 206 respectively.

At S305 in FIG. 11, when the difference integration unit 203 is provided with the activation order by the reception analysis unit 202, it reads out the basic job data and the differential job data stored in the memory unit 206, and develops them in the working memory. In addition, the page data of the basic job data developed in the working memory is defined as base(n), and the page data of the first page in the basic job data is defined as base(1), for example. That is to say, base(1)-base(5) correspond to each page of data in the basic job data to aaa.doc-301A. Also, the difference integration unit 203 stores empty diversion job data in the memory (S501).

Next, the difference integration unit 203 checks whether there is any unfinished page number (pt) and page data (ryu (n)) or not in the differential job data developed in the working memory (S502). Here, since there are two sets of the page number and the page data in the differential job data and both of them are unfinished (S502, Yes), the difference integration unit 203 extracts one set of the page number and the page data from the differential job data (S 503).

At S504, the difference integration unit 203 replaces base (1) page data with ryu(1) page data, and executes the processing from the S502 again. Since one more set of unfinished page number and page data remains (S502, Yes), the difference integration unit 203 extracts the one set of page number and page data from the differential job data (S503).

At S504 again, the difference integration unit 203 replaces base(4) page data with ryu(4) page data, and it executes the processing from S502 again. Since there is no set of unfinished page number and page data (S502, No) in the differential job data, the difference integration unit 203 stores the restored bbb.doc-301B in the memory unit 206 as the diversion job data relating to ID, JOB number, and data type.

As mentioned above, the first embodiment can minimize the amount of data transmitted by the host PC since, when a plurality of documents are printed, as for the print of the second or later documents (the diversion JOB) after the print of the first document (the base JOB), only the difference data from the first document is transmitted to the printer, and the second or later document is restored/generated and printed in the printer side. Also, since the processing to execute until the printer outputs the actual printed matter is simplified, the time until the user obtain the printed matter can be reduced.

Second Embodiment

Although, in the first embodiment, the image forming system can print a plurality of documents that vary in page content and have identical page numbers, it is explained the image forming system that can print a plurality of documents that vary in page contents and also vary in page number in the present embodiment. The documents to be printed in the present embodiment are configured as aaa.doc-301A, bbb2.doc-307B, ccc2.doc-307C, and ddd.doc-301D.

Bbb2.doc-307B is varied from aaa.doc-301A in that 1) the destination in page 1 is "Company B," 2) page 3 is added and 3) representative name in page 5 is different. Also, ccc2.doc-307C is varied from aaa.doc-301A in that 1) the destination in page 1 is "Company C," 2) a page corresponding to page 2 of aaa.doc-301A is deleted and 3) representative name in page 3 is different. The variation of ddd.doc-301D from aaa.doc-301A is identical in the first embodiment.

The image forming system that can print a plurality of documents configured in this way is explained below.

Since the configuration of the image forming system relating to the second embodiment in the present invention is virtually identical to the image forming system in the first embodiment, the identical parts are identified by identical reference numbers, explanation is omitted, and only differing parts are explained.

FIG. 27 is a block diagram illustrating the configuration of an image forming system relating to the second embodiment. The image forming system includes a host PC 300 as the image processing device that creates documents by the user's operation and generates a print job on the basis of the documents, and a printer 400 as the image forming device that can form images by electrophotography, for example. The host PC 300 and the printer 400 are connected via the network 900. To begin with, the host PC 300 is explained, and the printer 400 is explained next.

The host PC 300 includes a difference detection unit 304 instead of the difference detection unit 104 of the host PC 100 relating to the first embodiment.

Figure 28:
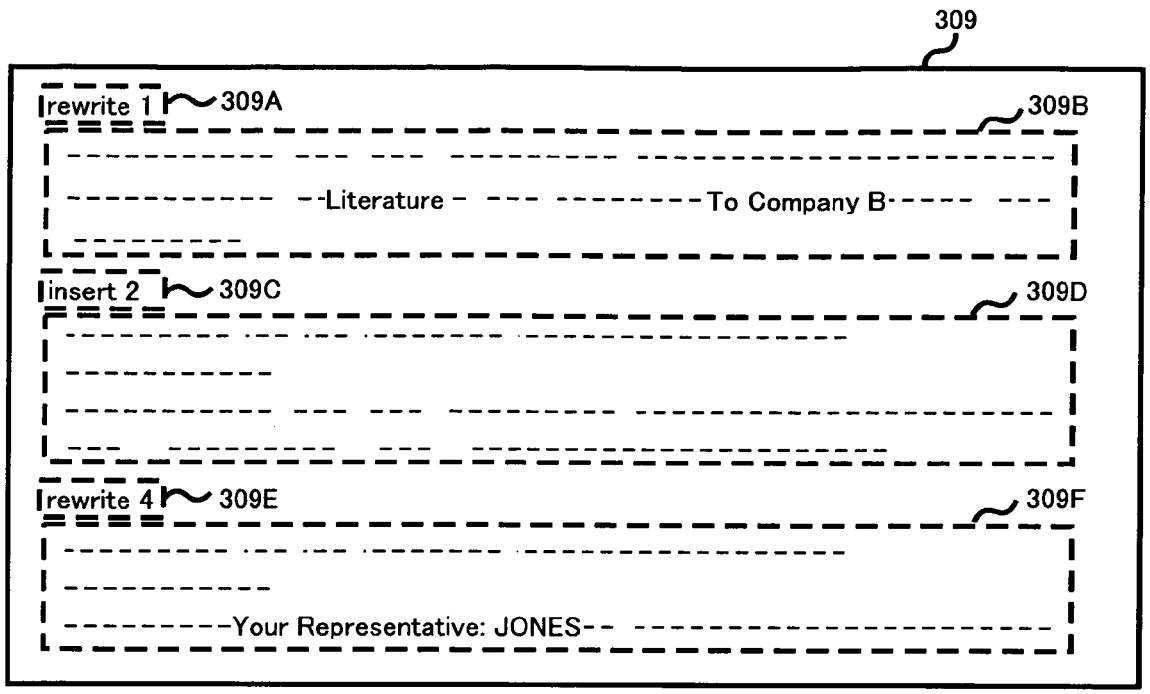
FIG. 28 is a view illustrating an example of the job data.

When a difference detection order between the basic job data of the base JOB and the diversion job data of the diversion JOB is provided by the printer driver 103, the difference detection unit 304 creates the differential job data 309 shown in FIG. 28 by searching corresponding basic job data of the base JOB and diversion job data of the diversion JOB in the print data memory unit 107A and comparing both sets of job data. The differential job data 309 shown in FIG. 28 is the differential job data of bbb2.doc-307B diversion job data to aaa.doc-301A basic job data when aaa.doc-301A is the base JOB and bbb2.doc-307B is the diversion JOB. Also, the difference detection unit 304 stores the created differential job data into the print data memory unit 107A. Furthermore, the difference detection unit 304 is an application program that operates on an operating system of the host PC 300 that is not shown in the figure. The application program is stored in nonvolatile memory such as a UV-EPROM or an EEPROM and performs the function when the CPU that is not shown in the figure reads it out from the memory unit 107 and executes processing on the basis of an execution command.

Next, the configuration of the printer 400 is explained. The printer 400 includes a difference integration unit 403 instead of the difference integration unit 203 of the printer 200 in the first embodiment.

When the difference integration unit 403 is provided a restoration order of the diversion job data of the diversion JOB by the reception analysis unit 202, it restores the job diversion job data of the diversion JOB by searching corresponding basic job t data and differential job data in the memory unit 206 and integrating them, and stores the diversion job data in the memory unit 206. Also, the difference integration unit 403 is the application program that the printer 400 includes. The application program is stored in nonvolatile memory such as a UV-EPROM, or an EEPROM and performs the function when the CPU that is not shown in the figure reads it out of the memory unit 107 and executes processing on the basis of an execution command.

Figure 29:
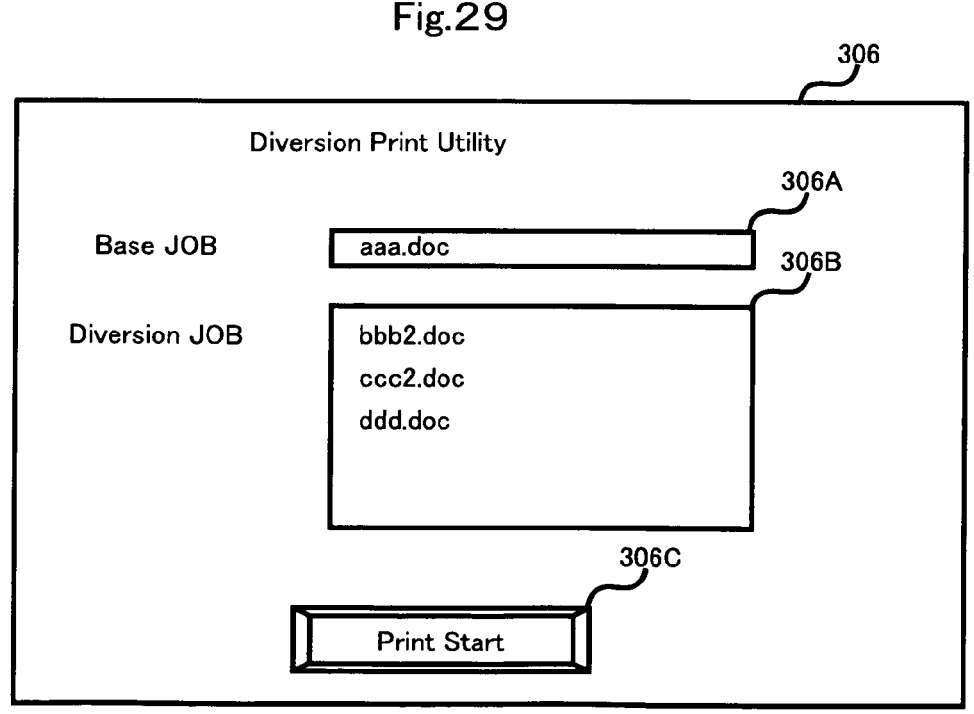
FIG. 29 is an example of user interface display.

The operation of the image forming system including the configuration as above is explained below. In addition, aaa-.doc-301A as the base JOB, and bbb2.doc-307B, ccc2.doc-307C, and ddd.doc-301D as the diversion JOB shall be input by the user through the a GUI 306 displayed on the monitor that is not shown in the figure by the diversion print utility 102 as shown in FIG. 29.

Figure 30:
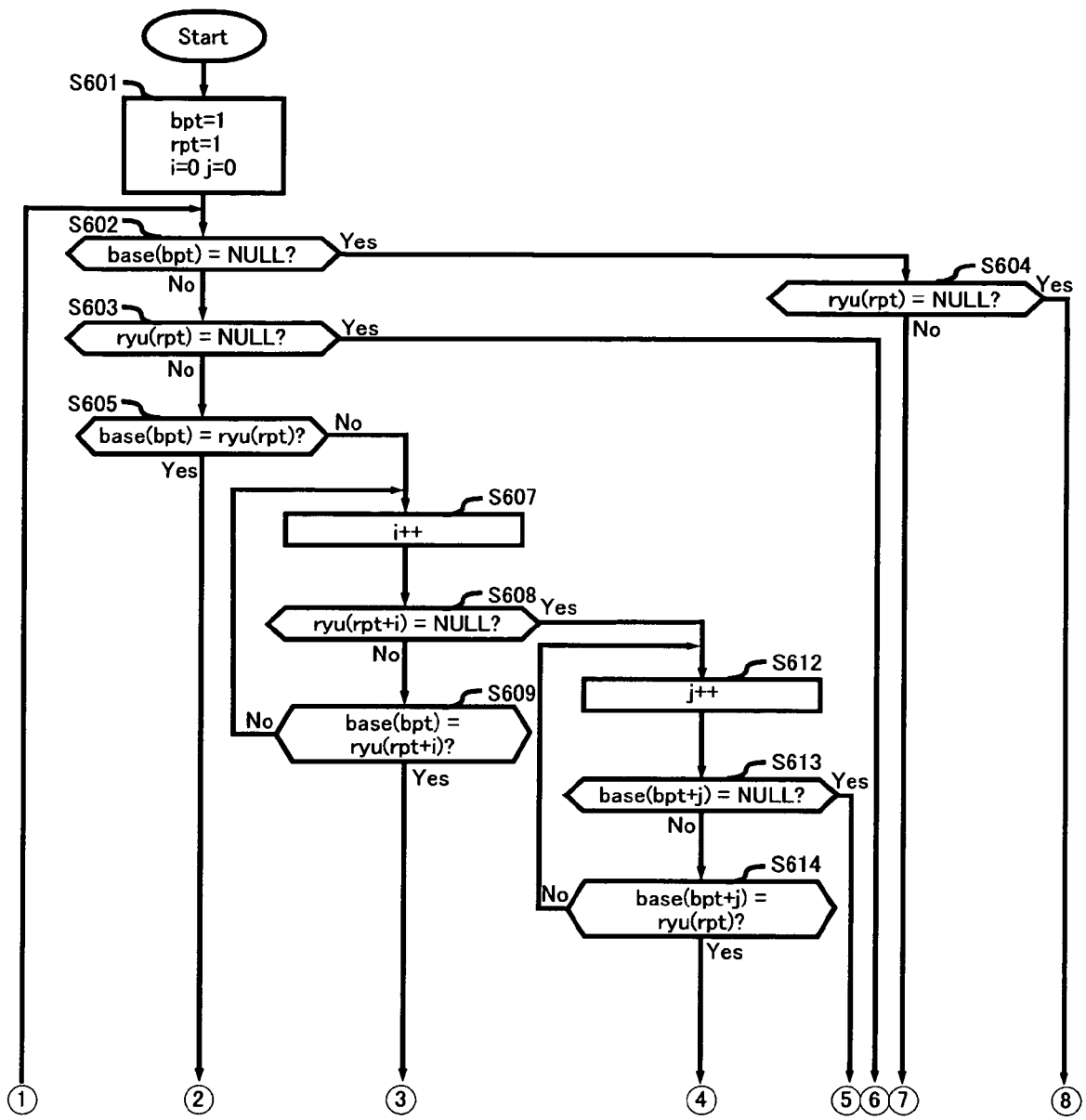
FIG. 30 is a flow diagram illustrating the processing that the difference detection unit creates the differential job data.
Figure 31:
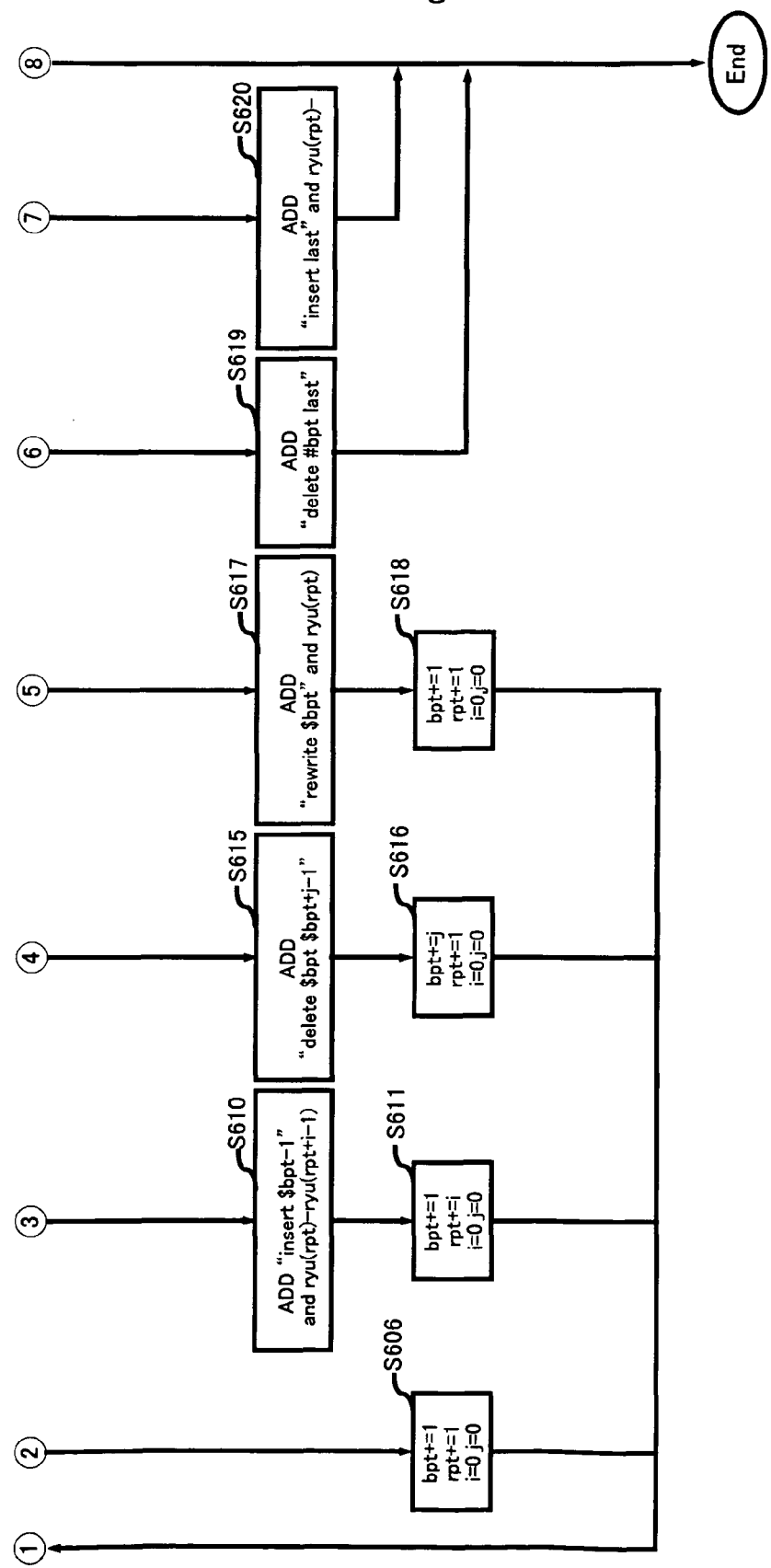
FIG. 31 is a flow diagram illustrating the processing that the difference detection unit creates the differential job data.
Figure 32:
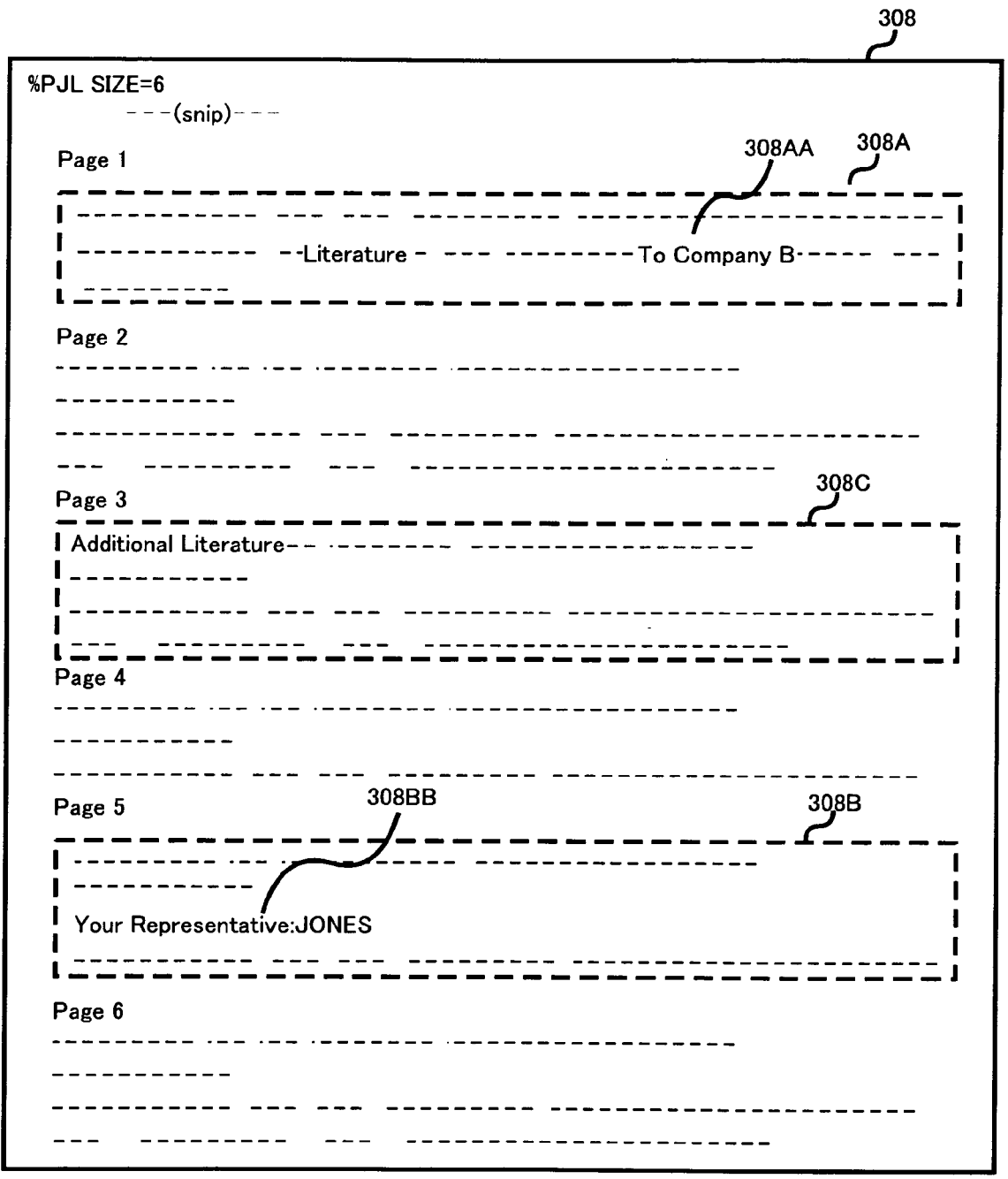
FIG. 32 is a view illustrating an example of the job data.
Figure 33:
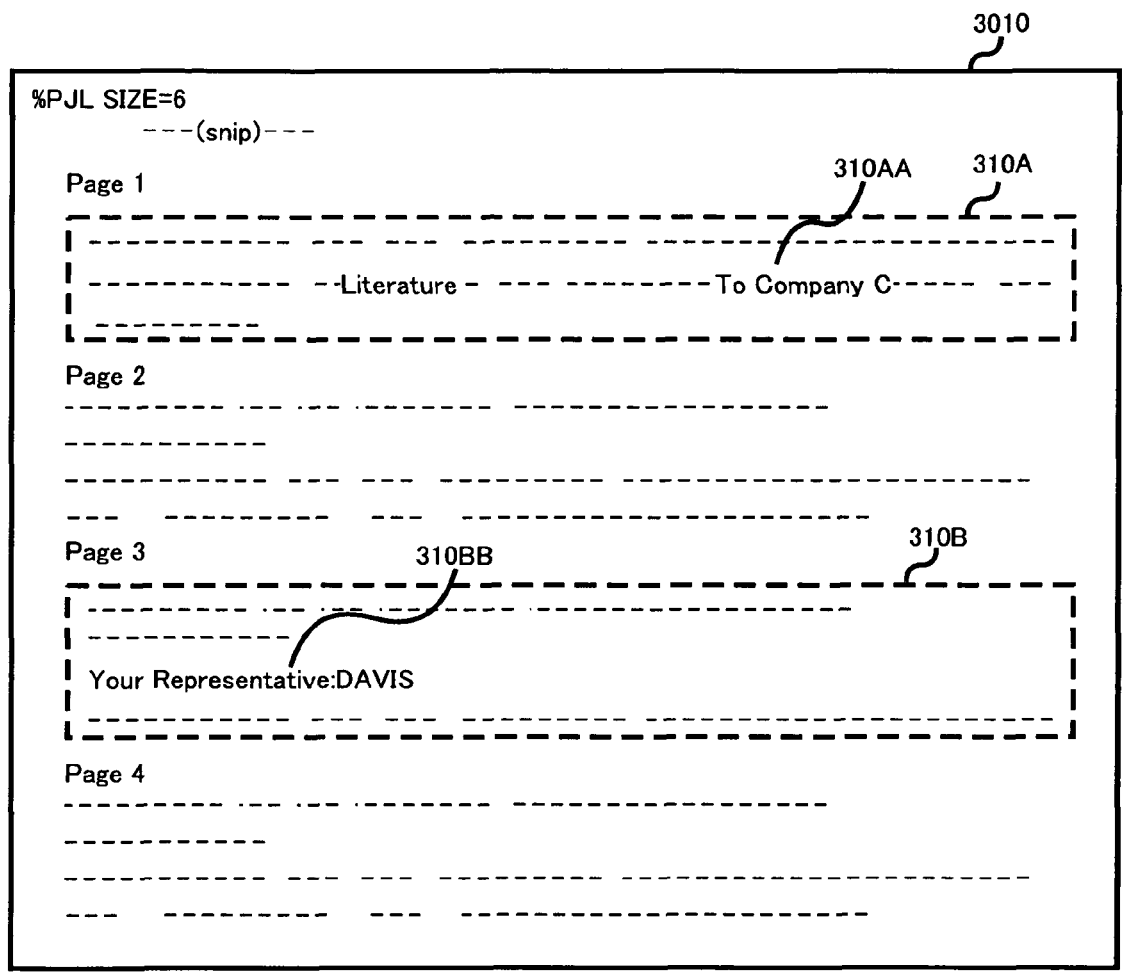
FIG. 33 is a view illustrating an example of the job data.

The diversion print utility 102, the printer driver 103, and the reception analysis unit 202 relating to the present embodiment execute identical processing to the processing executed by the diversion print utility 102, the printer driver 103, and the reception analysis unit 202 in the first embodiment. Therefore, in the explanations below, the processing of the differential job data creation by the difference detection unit 304 and the processing of the diversion job data restoration by the difference integration unit 403 are explained. To begin with, the processing of the differential job data creation by the difference detection unit 304 is explained by use of FIGS. 30 and 31. In addition, the processing of the differential job data creation is explained considering that aaa.doc-301A is the base JOB, and bbb2.doc-307B and ccc2.doc-307C are the diversion JOBs. Also, the basic job data 302 of aaa.doc-301A shown in FIG. 4, the diversion job data 308 of bbb2.doc-307B shown in FIG. 32 and the diversion job data 3010 of ccc2.doc-307C shown in FIG. 33 are created by the printer driver 103, and they are stored in the memory unit 107.

To begin with, the processing of bbb2.doc-307B is explained. At S208 in FIG. 10, when the difference detection unit 304 is provided the activation order by the printer driver 103, it reads out the basic job data of the base JOB and the diversion job data of the diversion JOB stored in the memory unit 107, and develops them in the working memory. Also, the difference detection unit 304 secures an empty differential job data in the memory. Furthermore, the difference detection unit 304 initializes the variables; bpt=1, pt=1, i=0, and j=0 (S601). Here, bpt and pt show the page numbers of the base JOB and the diversion JOB respectively that are in page processing. Also, i and j are versatile variables. In addition, the page data of the basic job data developed in the working memory is called base(n), and the page data of the diversion job data is called ryu(n). Page 1 data of the basic job data is called base(1), for example. That is to say, base(1)-base(5) correspond to each page data of the basic job print data of aaa.doc-301A, and ryu(1)-ryu(5) correspond to each page data of the diversion job data of bbb.doc-301B.

In S602, the difference detection unit 304 checks whether base(1) is NULL data or not. Since base(1) is not NULL data here (S602, No), the difference detection unit 304 checks whether or not ryu(1) is NULL data (S603). Since ryu(1) is not NULL data here (S603, No), the difference detection unit 304 checks whether or not there is any variation or not between base(1) and ryu(1) by comparison (S605). In particular, the difference detection unit 304 compares the page 1 data 302A in the basic job data 302 shown in FIG. 4 and the page 1 data 308A in the diversion job data 308 shown in FIG. 32. Here, "A" of point 302AA in the page data 302A and "B" of point 308AA in the page data 308A are different. Therefore, since there is a variation between base(1) and ryu(1) (S605, No). Furthermore, the difference detection unit 304 compares page 2 or later of bbb2.doc-307B and page 1 of aaa.doc-301A in order to check whether page 1 of bbb2.doc-307B is an additional page to aaa.doc-301A or not. That is, the difference detection unit 304 increments the variable i (S607) and checks whether ryu(2) is NULL data or not (S608). Here, since ryu(2) is not NULL data (S608, No), base(1) and ryu(2) are compared (S609). Here, base(1) and ryu(2) are not identical (S609, No), the difference detection unit 304 executes the processing from the S607 again.

The difference detection unit 304 repeats similar steps. That is to say, the difference detection unit 304 executes sequentially; i=2, comparison of base(1) and ryu(3); i=3, comparison of base(1) and ryu(4); i=4, comparison of base(1) and ryu(5); and i=5, comparison of base(1) and ryu(6) with incrementing variable i.

At the point of i=6 (S607), since ryu(7) does not exist, and it is NULL data (S608, Yes), the difference detection unit 304 judges that the same page as page 1 of aaa.doc-301A does not exist in bbb2.doc-307B. This shows that the page corresponding to ryu(1) is not the additional page to aaa.doc-301A, and page 1 of aaa.doc-301A is not necessary in bbb2.doc-307B and it is the target for deletion or replacement.

Following this, the difference detection unit 304 compares base(2) or later that corresponds to page 2 or later of aaa.doc-301A and ryu(1) in order to check whether page 1 of aaa.doc-301A is the target for deletion or not to bbb2.doc-307B. That is to say, the difference detection unit 304 increments variable j (S612), and checks whether base(2) is NULL data or not (S613). Here, since base(2) is not NULL data (S613, No), the difference detection unit 304 compares base(2) and ryu(1) (S614). Here, they are not identical (S614, No), the difference detection unit 304 executes the processing from S612 again.

The difference detection unit 304 repeats similar steps. That is to say, the difference detection unit 304 executes sequentially; j=2, comparison of base(3) and ryu(1); j=3, comparison of base(4) and ryu(1); and j=4, comparison of base(5) and ryu(1) with incrementing variable j.

At the point of j=5 (S612), since base(6) does not exist, and it is NULL data (S613, Yes), the difference detection unit 304 judges that the same page as page 1 of bbb2.doc-307B does not exist in aaa.doc-301A. This shows that the page corresponding to ryu(1) is necessary to integrate the differences, and page 1 of aaa.doc-301A is not the target for deletion. Therefore, the difference detection unit 304 concludes that the difference integration unit 403 replaces ryu(1) to base(1) in the difference integration. The difference detection unit 304 adds "rewrite 1" as the command 309A meaning this, and ryu(1) shown in page data 308A to the differential job data (S617). Also, the difference detection unit 304 increments bpt and pt (S618), initializes the variables i and j to 0, and executes the processing from S602 again.

At S602, the difference detection unit 304 checks whether base(2) is NULL data or not. Here, since base(2) is not NULL data (S602, No), the difference detection unit 304 checks whether ryu(2) is NULL data or not (S603). Here, since ryu(2) is not NULL (S603, No), the difference detection unit 304 checks whether there is any variation or not between base(2) and ryu(2) (S605). Here since base(2) and ryu(2) are identical (S605, Yes), the difference detection unit 304 increments bpt and pt, initializes the variables i and j into 0, and executes the processing from the S602 again.

At S602, the difference detection unit 304 checks whether base(3) is NULL data or not. Here, since base(3) is not NULL data (S602, No), the difference detection unit 304 checks whether ryu(3) is NULL data or not (S603). Here, since ryu(3) is not NULL data (S603, No), the difference detection unit 304 checks whether there is any variation or not between base(3) and ryu(3) by comparing (S605). Here, since there is a variation between base(3) and ryu(3) and they are not identical (S605, No), the difference detection unit 304 compares page 4 or later of bbb2.doc-307B and page 3 of aaa.doc-301A in order to check whether page 3 of bbb2.doc-307B is the additional page or not to aaa.doc-301A. That is to say, the difference detection unit 304 increments variable i (S607), and checks whether ryu(4) is NULL data or not (S608). Here, ryu(4) is not NULL data (S608, No), base(3) and ryu(4) is compared (S609). Here, since base(3) and ryu(4) are identical (S609, Yes), the difference detection unit 304 judges that page 3 of bbb2.doc-307B is page 3 of aaa.doc-301A, that is, it is the page data that is inserted before page 4 of bbb2.doc-307B. Therefore, the difference detection unit 304 adds "insert2" as the command 309C that means ryu(3) is inserted after base (2), and ryu(3) shown in the page data 308C to the differential job (S610). Also, the difference detection unit 304 increments bpt and pt (S611), initializes the variables i and j into 0, and executes the processing from S602 again.

After this, using similar steps, the difference detection unit 304 adds command 309E "rewrite 4" and ryu(5) shown in the page data 308B to the differential job data. Eventually, the differential job data 309 shown in FIG. 28 is created.

At the point that bpt=6 and pt=7, since base(6) is NULL data (S602, Yes), and ryu(7) is also NULL data (S604, Yes), the difference detection unit 304 stores the differential job data into the print data memory unit 107A, and ends the processing.

Figure 34:
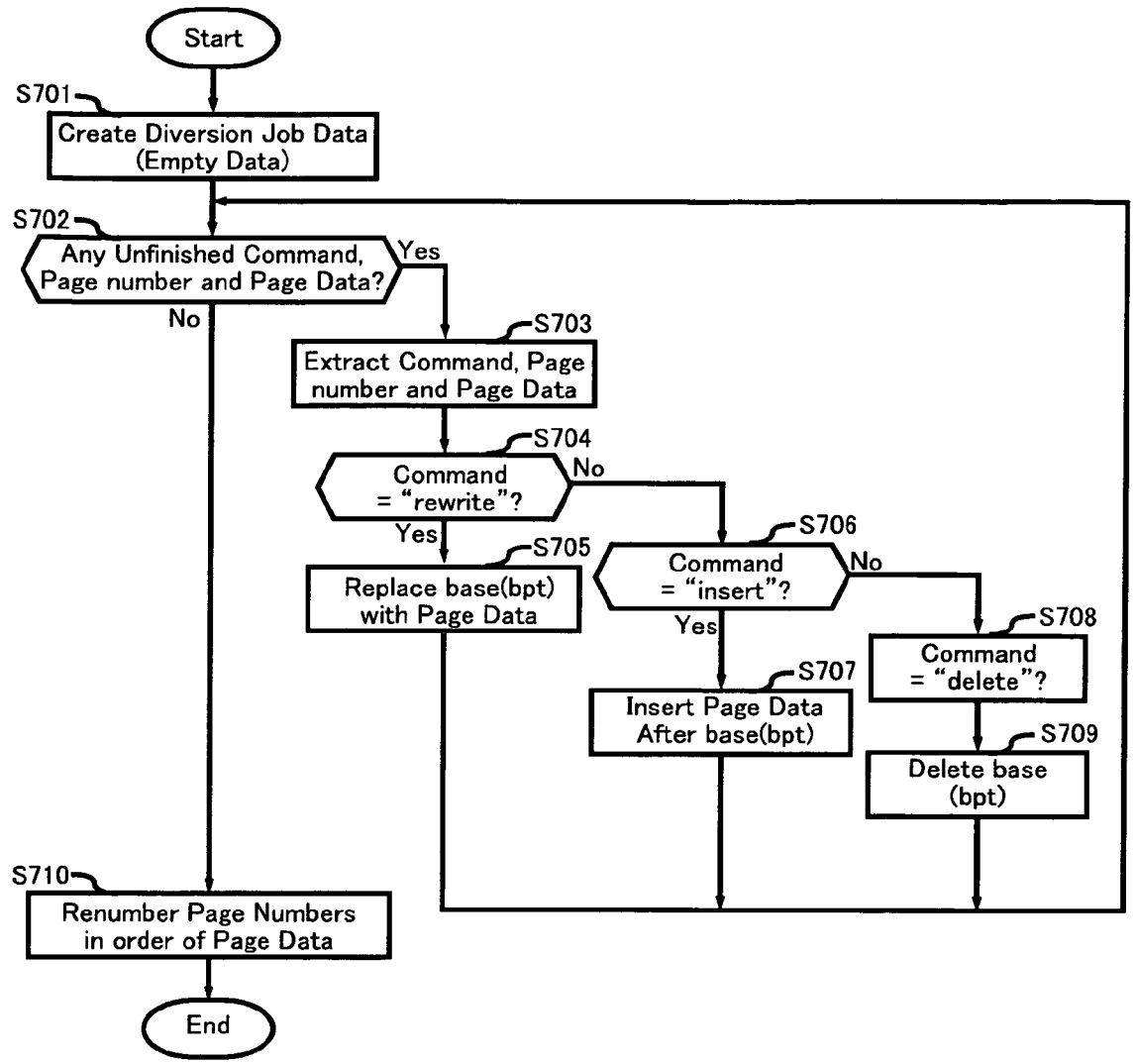
FIG. 34 is a flow diagram illustrating the processing that the difference integration unit restores the diversion job data.

Next, the processing of the diversion job data restoration by the difference integration unit 403 is explained by use of FIG. 34. The processing of the diversion job data restoration is explained considering that aaa.doc-301A is the base JOB, and bbb2.doc-307B is the diversion JOB. Also, the basic job data and the differential job data are transmitted to the printer 400 as the data by the host PC 300, and the data are stored in the memory unit 206, respectively.

At S305 in FIG. 11, when the difference integration unit 403 is provided with the activation order by the reception analysis unit 202, it reads out the basic job data and the differential job data stored in the memory unit 206, and develops them in the working memory. In addition, the page data of the basic job data developed in the working memory is defined as base(n), and the page data of the first page in the basic job data is defined as base(1), for example. That is to say, base(1)-base(5) correspond to each page of data in the basic job data to aaa.doc-301A. Also, the difference integration unit 403 secures empty diversion job data in the memory (S701).

Next, the difference integration unit 403 checks whether there is any unfinished command, page number and page data or not in the differential job data developed in the working memory (S702). Here, since there are three sets (command 309A and page data 309B, command 309C and page data 309D, and command 309E and page data 309F) in the differential job data and any of them are unfinished (S702, Yes), the difference integration unit 403 reads out one set of the command, the page number and the page data. That is, it is obtained that command="rewrite," bpt=1 and the page data 309B (=308A) from the command 309A (S703).

Next, at S704, the difference integration unit 403 judges whether the command is "rewrite" or not. Here, since the command is "rewrite" (S704, Yes), the difference integration unit 403 replaces base(1) to the page data 308B (S705) and executes the processing from the S702 again.

Similarly, the difference integration unit 403 checks whether there is any unfinished command, page number and page data or not in the differential job data developed in the working memory (S702). Here, since there are two sets (command 309C and page data 309D, and command 309E and page data 309F) and any of them are unfinished (S702, Yes), the difference integration unit 403 reads out one set of the command, the page number and the page data. That is, it is obtained that command="insert," bpt=2 and the page data 309D (=308C) from the command 309C (S703).

Next, at S704, the difference integration unit 403 judges whether the command is "rewrite" or not. Here, since the command is not "rewrite" (S704, No), the difference integration unit 403 judges whether the command is "insert" or not (S706). Here, since the command is "insert" (S706, Yes), the difference integration unit 403 adds the page data 309D after base(2) (S707) and executes the processing from S702 again.

Similarly, the difference integration unit 403 checks whether there is any unfinished command, page number and page data or not in the difference data developed in the working memory (S702). Here, since there is one set (command 309E and page data 309F) and it is unfinished (S702, Yes), the difference integration unit 403 reads out one set of the command, the page number and the page data. That is, it is obtained that command="rewrite," bpt=4 and the page data 309F (=308B) from the command 309C (S703).

Next, at S704, the difference integration unit 403 judges whether the command is "rewrite" or not. Here, since the command is "rewrite" (S704, Yes), the difference integration unit 403 replaces base(4) to the page data 308F (S705), and executes the processing from the S702 again.

Since there is no unfinished command, page number and page data in the differential job data developed in the working memory (S702, No), the difference integration unit 403 renumbers in order of page data (S710), stores the restored bbb2.doc307B in the memory unit 206 as the diversion job data, and ends the processing.

Next, the processing of ccc2.doc-307C is explained. At S208 in FIG. 10, when the difference detection unit 304 is provided with the activation order by the printer driver 103, it reads out the basic job data of the base JOB and the diversion job data of the diversion JOB stored in the memory unit 107, and develops them in the working memory. Also, the difference detection unit 304 secures an empty differential job data in the memory. Furthermore, the difference detection unit 304 initializes the variables; bpt=1, pt=1, i=0, and j=0 (S601). Here, bpt and pt show the page numbers of the base JOB and the diversion JOB respectively that are in page processing. Also, i and j are versatile variables. In addition, the page data of the basic job data developed in the working memory is called base(n), and the page data of the diversion job data is called ryu(n), and page 1 data of the basic job data is called base(1), for example. That is to say, base(1)-base(5) correspond to each page data of the basic job data of aaa.doc-301A, and ryu(1)-ryu(4) correspond to each page data of the diversion job data of ccc2.doc-307C.

At S602, the difference detection unit 304 checks whether base(1) is NULL data or not. Here, since base(1) is not NULL data (S602, No), the difference detection unit 304 checks whether ryu(1) is NULL data or not (S603). Here, since ryu(1) is not NULL data (S603, No), the difference detection unit 304 checks whether there is any variation or not between base(1) and ryu(1) by comparing (S605). In particular, the difference detection unit 304 compares page 1 data 302A of the basic job data 302 shown in FIG. 4 and page data 310A of the diversion job data 3010 shown in FIG. 33. Here, "A" of the point 302AA in the page data 302A and "C" of the point 310AA in the page data 310A are different. Therefore, there is a variation between base(1) and ryu(1) (S605, No). Furthermore, the difference detection unit 304 compares page 2 or later of ccc2.doc-307C and page 1 of aaa.doc-301A in order to check whether page 1 of ccc2.doc-307C is the additional page or not to aaa.doc-301A. That is to say, the difference detection unit 304 increments variable i (S607), and checks whether ryu(2) is NULL data or not (S608). Here, ryu(2) is not NULL data (S608, No), base(1) and ryu(2) is compared (S609). Here, since base(1) and ryu(2) are not identical (S609, No), the difference detection unit 304 executes the processing from S607 again.

The difference detection unit 304 repeats similar steps. That is to say, the difference detection unit 304 executes sequentially; i=2, comparison of base(1) and ryu(3); and i=3, comparison of base(1) and ryu(4) with incrementing variable i.

At the point of i=4 (S607), since ryu(5) does not exist, and it is NULL data (S608, Yes), the difference detection unit 304 judges that the same page as page 1 of aaa.doc-301A does not exist in ccc2.doc-307C. This shows that the page corresponding to ryu(1) is not the additional page to aaa.doc-301A, and page 1 of aaa.doc-301A is not necessary in ccc2.doc-307C and it is the target for deletion or replacement.

Following this, the difference detection unit 304 compares base(2) or later that corresponds to page 2 or later of aaa.doc-301A and ryu(1) in order to check whether page 1 of aaa.doc-301A is the target for deletion or not to ccc2.doc-307C. That is to say, the difference detection unit 304 increments variable j (S612), and checks whether base(2) is NULL data or not (S613). Here, since base(2) is not NULL data (S613, No), the difference detection unit 304 compares base(2) and ryu(1) (S614). Here, they are not identical (S614, No), so the difference detection unit 304 executes the processing from S612 again.

The difference detection unit 304 repeats similar steps. That is to say, the difference detection unit 304 executes sequentially; j=2, comparison of base(3) and ryu(1); j=3, comparison of base(4) and ryu(l); and j=4, comparison of base(5) and ryu(1) with incrementing the variable j.

At the point of j=5 (S612), since base(6) does not exist, and it is NULL data (S613, Yes), the difference detection unit 304 judges that the same page as page 1 of ccc2.doc-307C does not exist in aaa.doc-301A. This shows that the page corresponding to ryu(1) is necessary to integrate the differences, and page 1 of aaa.doc-301A is not the target for deletion. Therefore, the difference detection unit 304 concludes that the difference integration unit 403 replaces ryu(l) to base(1) in the difference integration. The difference detection unit 304 adds "rewrite 1" as the command 311A meaning this, and ryu(l) shown in page data 310A to the differential job data (S617). Also, the difference detection unit 304 increments bpt and pt (S618), initializes the variables i and j into 0, and executes the processing from the S602 again.

At S602, the difference detection unit 304 checks whether base(2) is NULL data or not. Here, since base(2) is not NULL data (S602, No), the difference detection unit 304 checks whether ryu(2) is NULL data or not (S603). Here, since ryu(2) is not NULL data (S603, No), the difference detection unit 304 checks whether there is any variation or not between base(2) and ryu(2) by comparing (S605). Here, since there is a variation between base(2) and ryu(2) and they are not identical (S605, No), the difference detection unit 304 compares page 3 or later of ccc2.doc-307C and page 2 of aaa.doc-301A in order to check whether page 2 of ccc2.doc-307C is the additional page or not to aaa.doc-301A. That is to say, the difference detection unit 304 increments variable i (S607), and checks whether ryu(3) is NULL data or not (S608). Here, ryu(3) is not NULL data (S608, No), base(2) and ryu(3) is compared (S609). Here, since base(2) and ryu(3) are not identical (S609, No), the difference detection unit 304 executes the processing from S607 again.

The difference detection unit 304 increments variable i (S607), and checks whether ryu(4) is NULL data or not (S608). Here, ryu(4) is not NULL data (S608, No), base(2) and ryu(4) is compared (S609). Here, since base(2) and ryu (4) are not identical (S609, No), the difference detection unit 304 executes the processing from S607 again.

Once again, the difference detection unit 304 increments the variable i (S607), at the point of i=3, since ryu(5) does not exist and is NULL data (S608, Yes), The difference detection unit 304 judges that page 2 of aaa.doc-301A does not exist in ccc2.doc-307C.

Following this, the difference detection unit 304 compares base(3) or later that corresponds to page 3 or later of aaa.doc-301A and ryu(2) in order to check whether page 2 of aaa.doc-301A is the target for deletion or not to ccc2.doc-307C. That is to say, the difference detection unit 304 increments the variable j (S612), and checks whether base(3) is NULL data or not (S613). Here, since base(3) is not NULL data (S613, No), the difference detection unit 304 compares base(3) and ryu(2) (S614). Here, they are identical (S614, Yes), so the difference detection unit 304 judges that page 2 of aaa.doc-301A is an extra page separately, and adds "delete2" that is the command 311C meaning that the page data is the target for deletion to the differential job data.

Figure 35:
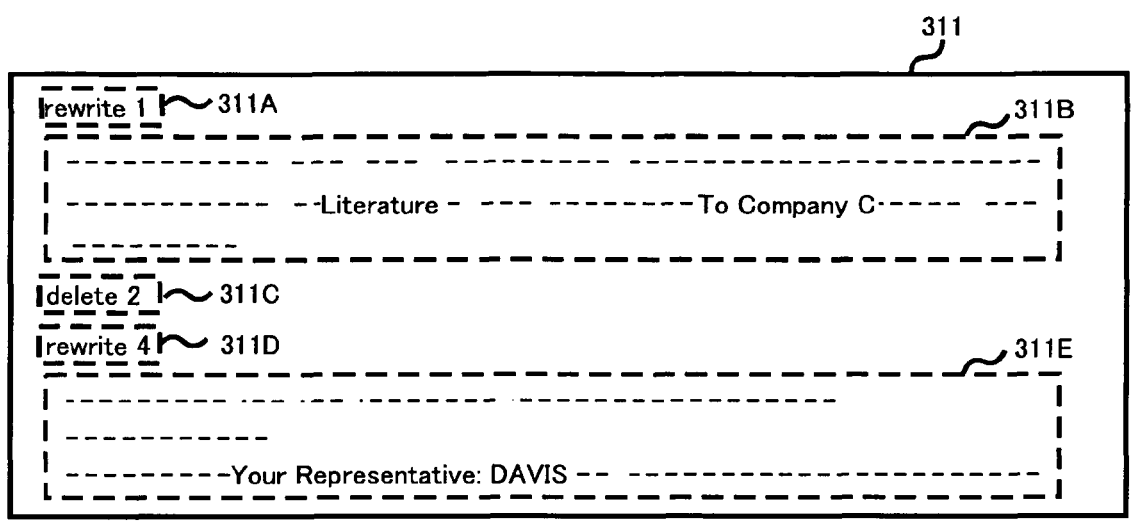
FIG. 35 is a view illustrating an example of the job data.

After this, using the similar steps, the difference detection unit 304 adds the command 311D "rewrite4" and ryu(3) shown in the page data 310B to the difference data. Eventually, the differential job data 311 shown in FIG. 35 is created.

At the point that bpt=6 and pt=5, since base(6) is NULL data (S602, Yes), and ryu(5) is also NULL data (S604, Yes), the difference detection unit 304 stores the differential job data into the print data memory unit 107A, and ends the processing.

Next, the processing of the diversion job data restoration by the difference integration unit 403 is explained by use of FIG. 34. The processing of the diversion job data restoration is explained considering that aaa.doc-301A is the base JOB, and ccc2.doc-307C is the diversion JOB. Also, the printer 400 is transmitted the basic job data and the differential job data as the data by the host PC 300, and the data is stored in the memory unit 206, respectively.

At S305 in FIG. 11, when the difference integration unit 403 is provided with the activation order by the reception analysis unit 202, it reads out the basic job data and the differential job data stored in the memory unit 206, and develops them in the working memory. In addition, the page data of the basic job data developed in the working memory is defined base(n), and the page data of the first page in the basic job data is defined base(1), for example. That is to say, base(1)-base(5) corresponds to each page data in the basic job data of aaa.doc-301A. Also, the difference integration unit 403 secures empty diversion job data in the memory (S701).

Next, the difference integration unit 403 checks whether there is any unfinished command, page number and page data or not in the differential job data developed in the working memory (S702). Here, since there are three sets (command 311A and page data 311B, command 311C, and command 311D and page data 311E) in the differential job data and any of them are unfinished (S702, Yes), the difference integration unit 403 reads out one set of the command, the page number and the page data. That is, it is obtained that command="rewrite," bpt=1 and the page data 311B (=310A) (S703).

Next, at S704, the difference integration unit 403 judges whether the command is "rewrite" or not. Here, since the command is "rewrite" (S704, Yes), the difference integration unit 403 replaces base(1) to the page data 311B (S705) and executes the processing from the S702 again.

Similarly, the difference integration unit 403 checks whether there is any unfinished command, page number and page data or not in the differential job data developed in the working memory (S702). Here, since there are two sets (command 311C, and command 311D and page data 311E) in the differential job data and any of them are unfinished (S702, Yes), the difference integration unit 403 reads out one set of the command, the page number and the page data. That is, it is obtained that command="delete," bpt=2 and the page data NULL from the command 311C (S703).

Next, at S704, the difference integration unit 403 judges whether the command is "rewrite" or not. Here, since the command is not "rewrite" (S704, No), the difference integration unit 403 judges whether the command is "insert" or not (S706). Here, since the command is not "insert" (S706, No), the difference integration unit 403 judges whether the command is "delete" or not (S708). Here, Since the command is "delete" (S708, Yes), the difference integration unit 403 deletes base(2) (S709) and executes the processing from the S702 again.

Similarly, the difference integration unit 403 checks whether there is any unfinished command, page number and page data or not in the difference data developed in the working memory (S702). Here, since there is one set (command 311D and page data 311E) and it is unfinished (S702, Yes), the difference integration unit 403 reads out one set of the command, the page number and the page data. That is, it is obtained that command="rewrite," bpt=4 and the page data 311E (=310B) (S703).

Next, at S704, the difference integration unit 403 judges whether the command is "rewrite" or not. Here, since the command is "rewrite" (S704, Yes), the difference integration unit 403 replaces base(4) to the page data 311E (S705), and executes the processing from the S702 again.

Since there is no unfinished command, page number and page data in the differential job data developed in the working memory (S702, No), the difference integration unit 403 renumbers in order of page data (S710), stores the restored ccc2.doc-307C in the memory unit 206 as the diversion job data, and ends the processing.

As mentioned above, in addition to the effect of the first embodiment, since the second embodiment not only checks the existence of variation for each page, but detects overages and shortages of the pages referring to later pages when the number of pages varies, even if there is not only replacement of the pages but also overages and shortages of them, it can prevent increasing the differential job data because of the page data comparison that is out of alignment after overages and shortages of the pages, reduce the data size of the differential job data, and keep the amount of data transmitted by the host PC to a minimum. Also, since the processing, which is required until the printer outputs the actual printed matter, is simplified, the time until the user obtains the printed matter can be reduced.

Although a PC is used as the image processing device in the explanation of the present embodiments, a system using a workstation or the like may utilize the present invention. Also, although the printer is described as the image forming device, an MFP, a facsimile, or copy machine may alternatively be used. Furthermore, a network is used as a communication path that connects the image processing device and the image forming device. However, other communication paths such as RS232C, IEEE1284 and USB may be used.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An image forming system, comprising:
   an image processing device configured to generate a print job based on a document created by a user, the image processing device including:
   a print job accepting unit configured to accept a designation of a basic job from among a plurality of print jobs as well as to accept an input of a print execution order for the plurality of print jobs;
   a job data creating unit configured to create job data corresponding to the print jobs by accepting the input of a print execution order via the print job accepting unit;
   a differential job data creating unit configured to create differential job data by comparing basic job data of the basic job and diversion job data of an other print job of the plurality of print jobs; and
   a job data transmit unit configured to transmit the basic job data and the differential job data created by the differential job data creating unit; and
   an image forming device including:
   a communication unit configured to receive the basic job data and the differential job data transmitted by the job data transmit unit;
   a difference integration unit configured to restore the diversion job data by use of the basic job data and the differential job data received via the communication unit; and
   a print controller configured to form images based on the basic job data and the diversion job data restored by the difference integration unit.

2. The image forming system of claim 1, wherein
the differential job data creating unit sequentially compares the basic job data with the diversion job data page by page, wherein
when a page of the diversion job data is not coincident with a relative page of the basic job data, the differential job data creating unit compares the page of the diversion job data with another page of the basic job data that follows the relative page, and when the page of the diversion job data is coincident with the another page of the basic job data, the differential job data creating unit determines that the relative page of the basic job data is an extra page for the diversion job data.

3. The image forming system of claim 1, wherein
the differential job data creating unit sequentially compares the basic job data with the diversion job data page by page, wherein,
when a page of the basic job data is not coincident with a relative page of the diversion job data, the differential job data creating unit compares the page of the basic job data with another page of the diversion job data that follows the relative page, and when the page of the basic job data is coincident with the another page of the diversion job data, the differential job data creating unit determines that the relative page of the diversion job data is to be newly inserted into the diversion job data.

4. The image forming system of claim 1, further comprising:
a user interface configured to select the basic job and the other print job.

5. The image forming system of claim 4, wherein
the user interface is configured to accept an input of a print start after selecting the basic job and the other print job.

6. The image forming system of claim 1, wherein
the job data transmit unit is configured to transmit the differential job data after transmitting the basic job data.

7. The image forming system of claim 1, wherein
the differential job data is made up in units of page.

8. The image forming system of claim 1, wherein
the difference integration unit restores the diversion job data by integrating the basic job data and the differential job data having an identical identification code to the basic job.

9. An image processing device for generating a print job based on documents created by a user and transmitting it to an image forming device, the image processing device comprising:
a print job accepting unit configured to accept a designation of a basic job from among a plurality of print jobs as well as to accept an input print execution order for the plurality of print jobs;
a job data creating unit configured to create job data corresponding to the print jobs by accepting the input print execution order via the print job accepting unit;
a differential job data creating unit configured to create differential job data by comparing basic job data of the basic job and diversion job data of an other print job of the plurality of print jobs; and
a job data transmit unit configured to transmit the basic job data and the differential job data created by the differential job data creating unit to the image forming device.

10. The image processing device of claim 9, comprising:
the differential job data creating unit sequentially compares the basic job data with the diversion job data page by page, wherein
when a page of the diversion job data is not coincident with a relative page of the basic job data, the differential job data creating unit compares the page of the diversion job data with another page of the basic job data that follows the relative page, and when the page of the diversion job data is coincident with the another page of the basic job data, the differential job data creating unit determines that the relative page of the basic job data is an extra page for the diversion job data.

11. The image processing device of claim 9, comprising:
the differential job data creating unit sequentially compares the basic job data with the diversion job data page by page, wherein,
when a page of the basic job data is not coincident with a relative page of the diversion job data, the differential job data creating unit compares the page of the basic job data with another page of the diversion job data that follows the relative page, and when the page of the basic job data is coincident with the another page of the diversion job data, the differential job data creating unit determines that the relative page of the diversion job data is to be newly inserted into the diversion job data.

12. The image processing device of claim 9, further comprising:
a user interface configured to select the basic job and the other print job.

13. The image processing device of claim 12, wherein
the user interface is configured to accept an input of a print start after selecting the basic job and the other print job.

14. The image processing device of claim 9, wherein
the job data transmit unit is configured to transmit the differential job data after transmitting the basic job data.

15. The image processing device of claim 9, wherein
the differential job data is made up in units of page.

* * * * *